(12) United States Patent
Kim et al.

(10) Patent No.: US 6,962,739 B1  
(45) Date of Patent: Nov. 8, 2005

(54) SUPPLE PENETRATION RESISTANT FABRIC AND METHOD OF MAKING

(75) Inventors: Young-Hwa Kim, Hudson, WI (US); Hong Ji, Woodbury, MN (US); Nicole Dawn Renneberg, Roseville, MN (US); Seong-Gi Baek, Woodbury, MN (US)

(73) Assignee: Higher Dimension Medical, Inc., Oakdale, MN (US)

( * ) Notice: Subject to any disclaimer, the term of this patent is extended or adjusted under 35 U.S.C. 154(b) by 125 days.

(21) Appl. No.: 09/610,748

(22) Filed: Jul. 6, 2000

(51) Int. Cl.$^7$ .............. B32B 3/14; B32B 3/16; B32B 3/00; B32B 5/02; B32B 27/12; B32B 27/04; F41H 1/02; F41H 1/04; A41D 19/00

(52) U.S. Cl. .............. 428/47; 428/53; 428/56; 428/911; 442/134; 2/2.5; 2/161.7

(58) Field of Search ................. 428/47, 52, 53, 428/56, 120, 133, 911; 2/2.5, 161.7; 442/134

(56) References Cited

U.S. PATENT DOCUMENTS

| | | | | |
|---|---|---|---|---|
| 1,758,296 A | * | 5/1930 | Schaumann ................. 428/47 |
| 3,179,551 A | | 4/1965 | Dudas ..................... 161/116 |
| 3,227,574 A | | 1/1966 | Mohr ...................... 117/45 |
| 3,553,066 A | | 1/1971 | Cavalier et al. ........... 161/73 |
| 3,633,216 A | | 1/1972 | Schonholtz ................ 2/168 |
| 3,813,281 A | | 5/1974 | Burgess et al. ............ 161/159 |
| 3,867,239 A | | 2/1975 | Alesi et al. ............... 161/37 |
| 3,867,727 A | | 2/1975 | Povlacs ................... 2/161 R |
| 3,894,472 A | | 7/1975 | Davis ..................... 189/36 |
| 4,292,882 A | * | 10/1981 | Clausen ................... 89/36 |
| 4,442,150 A | | 4/1984 | Greiner et al. ............ 428/53 |
| 4,569,874 A | | 2/1986 | Kuznetz ................... 428/109 |
| 4,603,069 A | | 7/1986 | Haq et al. ................ 428/76 |
| 4,623,574 A | | 11/1986 | Harpell et al. ............ 428/113 |
| 4,742,578 A | | 5/1988 | Seid ...................... 2/2.5 |
| 4,793,354 A | | 12/1988 | Wright et al. ............. 128/630 |
| 4,810,559 A | | 3/1989 | Fortier et al. ............ 428/161 |
| 4,833,733 A | | 5/1989 | Welch et al. .............. 2/169 |
| 4,858,245 A | | 8/1989 | Sullivan et al. ........... 2/21 |
| 4,861,666 A | * | 8/1989 | LeGrand et al. ........... 428/911 |

(Continued)

FOREIGN PATENT DOCUMENTS

| | | | |
|---|---|---|---|
| DE | 2927653 A1 | 7/1979 | |
| DE | 3718453 | 6/1987 | |
| DE | 3938741 A1 | 11/1989 | |
| EP | 028 476 A1 | 10/1980 | |
| EP | 0 028476 | 10/1983 | |
| EP | 0 657 110 A1 | 8/1994 | |
| EP | 0 657 110 A1 | 6/1995 | .......... F41D/13/10 |
| GB | 2 130 073 A | 5/1984 | |
| GB | 2238460 | 6/1991 | |
| GB | 2 287 639 | 9/1995 | |
| GB | 2 287 639 A | 9/1995 | |
| GB | 2 302 794 | 2/1997 | |
| GB | 2 302 794 A | 2/1997 | |
| IT | 737334 | 1/1968 | |
| JP | 52062502 | 5/1977 | |
| JP | 8-120574 | 5/1996 | |
| WO | WO 92/08094 | 5/1992 | |
| WO | WO92/08094 | 5/1992 | |
| WO | WO 92/20520 | 5/1992 | |
| WO | WO 92/20519 | 11/1992 | |
| WO | WO 93/21492 | 10/1993 | |
| WO | WO93/21492 | 10/1993 | |
| WO | WO 95/07033 | 3/1995 | |
| WO | WO 98/00039 | 1/1998 | |
| WO | WO 98/53715 | 12/1998 | |
| WO | WO 01/29299 A2 | 10/2000 | |

Primary Examiner—Jeremy R. Pierce  
(74) Attorney, Agent, or Firm—Westman, Champlin & Kelly, P.A.

(57) ABSTRACT

A puncture, pierce, and cut resistant fabric comprised of a plurality of sheets of plates arranged in a repeating pattern. A material interconnects the plates. The fabric is twistable, bendable, and flexible. It is constructed of substances that will withstand cutting, puncture, and piercing forces encountered in medical or other environments.

13 Claims, 34 Drawing Sheets

U.S. PATENT DOCUMENTS

| | | | | |
|---|---|---|---|---|
| 4,864,661 | A | 9/1989 | Gimbel | 2/167 |
| 4,881,277 | A | 11/1989 | Hogle | 2/169 |
| 4,901,372 | A | 2/1990 | Pierce | 2/167 |
| 4,916,000 | A | 4/1990 | Li et al. | 428/105 |
| 4,919,966 | A | 4/1990 | Shlenker | 427/2 |
| 4,995,119 | A | 2/1991 | Codkind | 2/163 |
| 5,020,162 | A | 6/1991 | Kersten et al. | 2/164 |
| 5,070,540 | A | 12/1991 | Bettcher et al. | 2/2.5 |
| 5,070,543 | A | 12/1991 | Beck | 2/169 |
| 5,087,499 | A | 2/1992 | Sullivan | 428/85 |
| 5,093,933 | A | 3/1992 | Berry | 2/161 R |
| 5,132,167 | A | 7/1992 | Prato | 428/251 |
| 5,138,719 | A | 8/1992 | Orlianges et al. | 2/168 |
| 5,156,900 | A * | 10/1992 | Nishimura | 428/151 |
| 5,172,424 | A | 12/1992 | Adkins | 2/21 |
| 5,173,966 | A | 12/1992 | DeLeo | 2/168 |
| 5,187,023 | A | 2/1993 | Prevorsek et al. | 428/911 |
| 5,187,815 | A | 2/1993 | Stern et al. | 2/161 R |
| 5,196,252 | A | 3/1993 | Harpell | 428/102 |
| 5,200,263 | A | 4/1993 | Gould et al. | 428/323 |
| 5,210,877 | A | 5/1993 | Newman | 2/2 |
| 5,231,700 | A | 8/1993 | Cutshall | 2/161.7 |
| 5,259,069 | A | 11/1993 | Gimbel | 2/168 |
| 5,306,532 | A * | 4/1994 | Tsien et al. | 428/33 |
| 5,308,683 | A | 5/1994 | Dees, Jr. et al. | 428/195 |
| 5,317,759 | A | 6/1994 | Pierce | 2/161.7 |
| 5,335,373 | A | 8/1994 | Dangman et al. | 2/161.7 |
| 5,336,555 | A | 8/1994 | Darras et al. | 428/247 |
| 5,345,612 | A | 9/1994 | Stein | 2/168 |
| D351,930 | S | 10/1994 | Snider et al. | D29/113 |
| 5,357,636 | A | 10/1994 | Dresdner, Jr. et al. | 2/161.7 |
| 5,368,930 | A | 11/1994 | Samples | 428/323 |
| 5,407,612 | A | 4/1995 | Gould et al. | 264/24 |
| D358,245 | S | 5/1995 | DeLeo | D2/617 |
| 5,421,033 | A | 6/1995 | DeLeo | 2/161.7 |
| 5,423,090 | A | 6/1995 | Gimbel | 2/161.7 |
| 5,425,142 | A | 6/1995 | Scott | 2/19 |
| 5,428,841 | A | 7/1995 | Stein | 2/168 |
| 5,442,815 | A | 8/1995 | Cordova et al. | 2/161.7 |
| 5,442,816 | A | 8/1995 | Seketa | 2/161.7 |
| 5,448,777 | A | 9/1995 | Lew | 2/161.7 |
| 5,459,879 | A | 10/1995 | Fuchs | 2/161.7 |
| 5,500,957 | A | 3/1996 | Stein | 2/169 |
| 5,511,241 | A | 4/1996 | Ziegler | 2/2.5 |
| 5,515,548 | A | 5/1996 | Lazarus | 2/169 |
| 5,548,844 | A | 8/1996 | Ceresia | 2/161.7 |
| 5,564,127 | A | 10/1996 | Manne | 2/161.7 |
| 5,568,657 | A | 10/1996 | Cordova et al. | 2/167 |
| 5,569,348 | A | 10/1996 | Hefele | 156/239 |
| 5,575,296 | A | 11/1996 | Peck | 128/880 |
| 5,601,895 | A | 2/1997 | Cunningham | 428/66.6 |
| 5,626,949 | A | 5/1997 | Blauer et al. | 428/196 |
| 5,632,948 | A | 5/1997 | Moore | 264/243 |
| 5,644,797 | A | 7/1997 | Daneshvar | 2/161.7 |
| 5,665,810 | A | 9/1997 | Patchett et al. | 524/449 |
| 5,677,029 | A | 10/1997 | Prevorsek et al. | 428/113 |
| 5,687,424 | A | 11/1997 | Masley | 2/163 |
| D389,608 | S | 1/1998 | Kraatz | D29/123 |
| 5,706,520 | A | 1/1998 | Thornton et al. | 2/21 |
| 5,709,920 | A | 1/1998 | Danton | 428/68 |
| 5,745,919 | A | 5/1998 | Kraatz | 2/161.6 |
| 5,752,279 | A | 5/1998 | Hochmuth | 2/161.1 |
| 5,759,626 | A | 6/1998 | Hefele | 427/265 |
| 5,761,743 | A | 6/1998 | Andrews et al. | 2/21 |
| 5,773,373 | A | 6/1998 | Wynne et al. | 442/260 |
| 5,789,327 | A | 8/1998 | Rousseau | 442/135 |
| 5,799,333 | A | 9/1998 | McGarry et al. | 2/161.6 |
| 5,853,863 | A | 12/1998 | Kim | 428/223 |
| 5,854,143 | A | 12/1998 | Schuster et al. | 442/135 |
| 5,855,991 | A | 1/1999 | McLarty, III | 428/195 |
| 5,883,021 | A | 3/1999 | Beer et al. | 442/172 |
| 5,906,873 | A | 5/1999 | Kim | 428/57 |
| 5,925,441 | A | 7/1999 | Blauer et al. | 428/196 |
| 5,935,678 | A | 8/1999 | Park | 428/105 |
| 5,953,751 | A * | 9/1999 | Kobren | 2/16 |
| 6,000,055 | A | 12/1999 | Citterio | 2/2.5 |
| 6,020,057 | A | 2/2000 | Darras | 428/323 |
| 6,080,474 | A | 6/2000 | Oakley et al. | 428/323 |

* cited by examiner

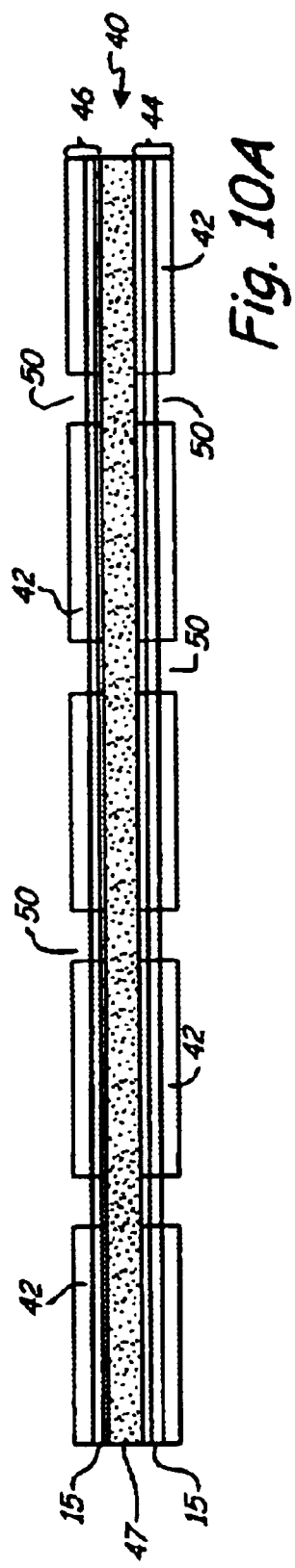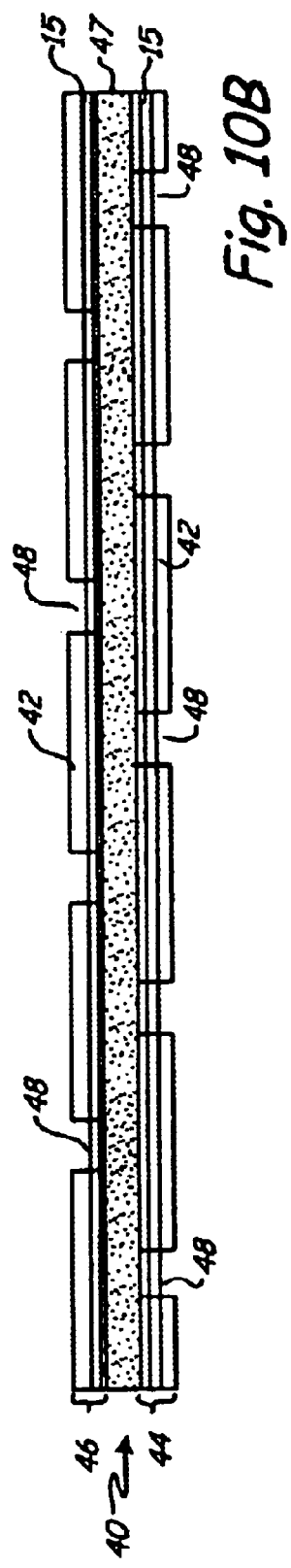

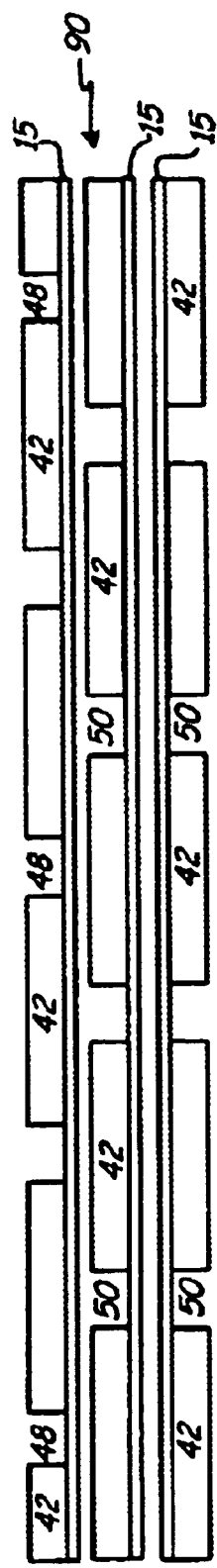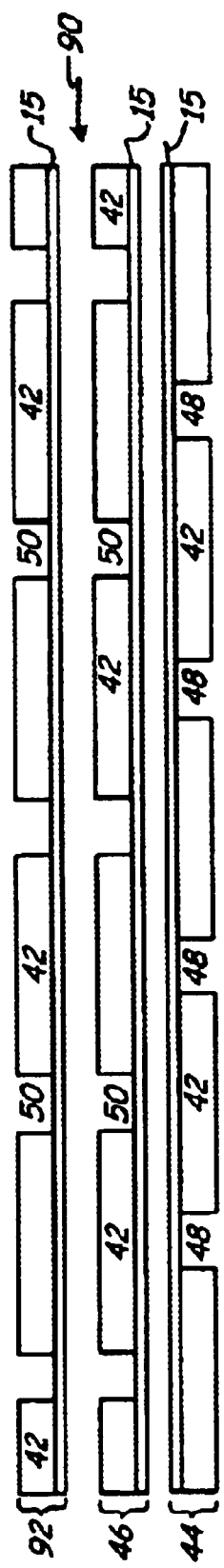

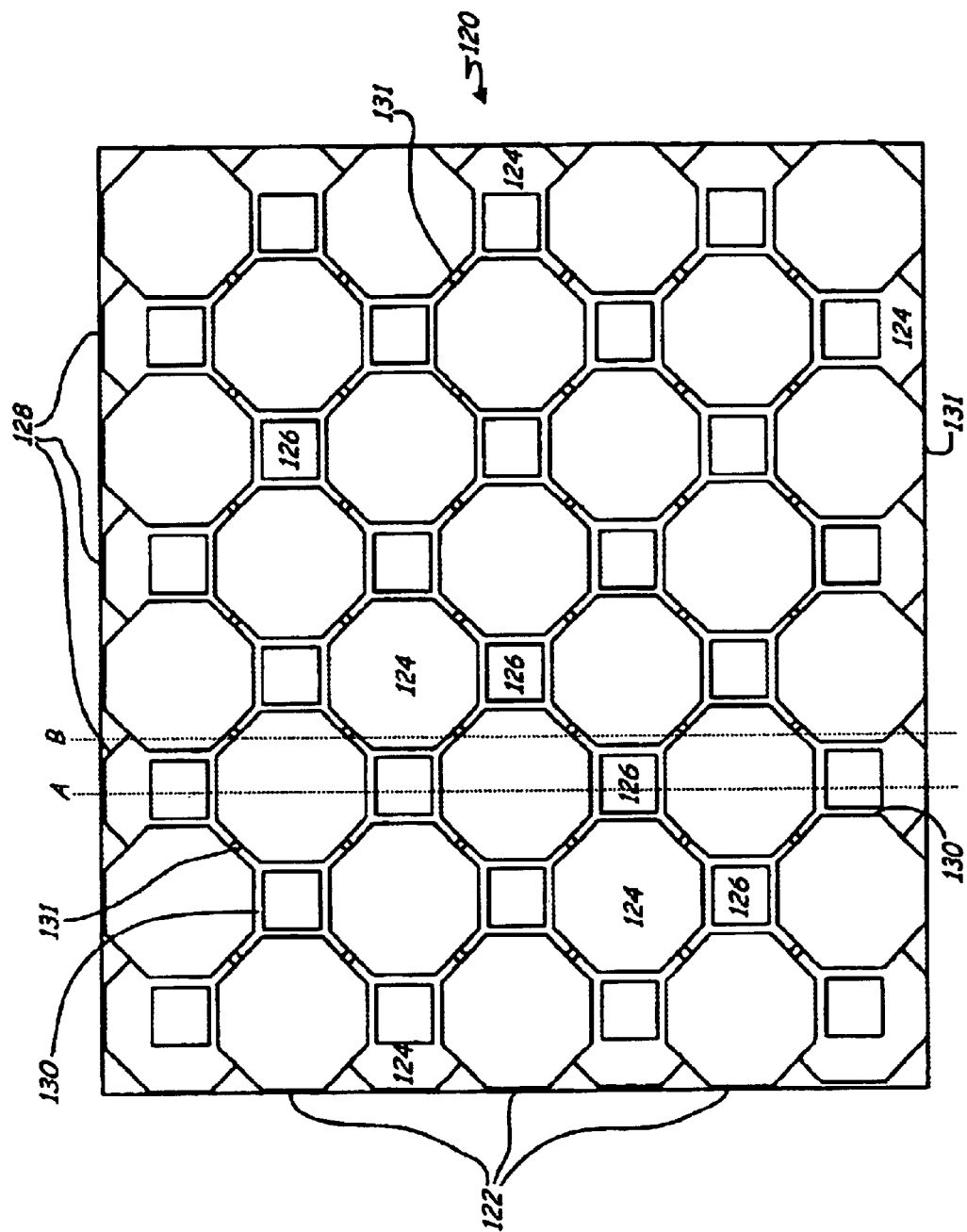

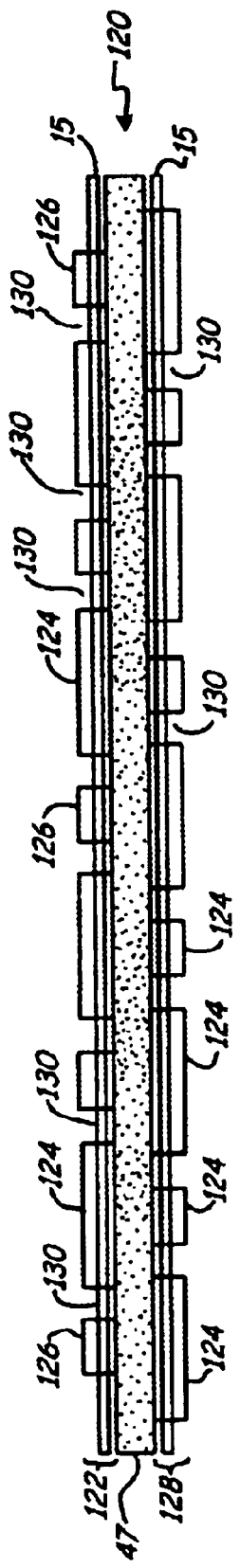
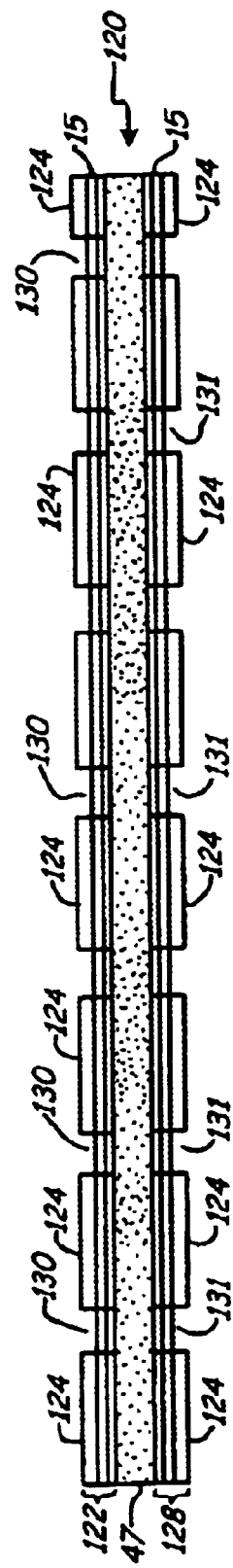

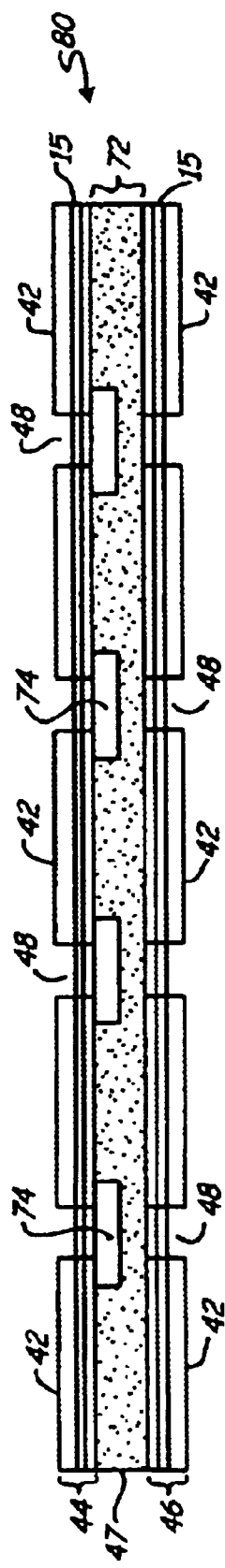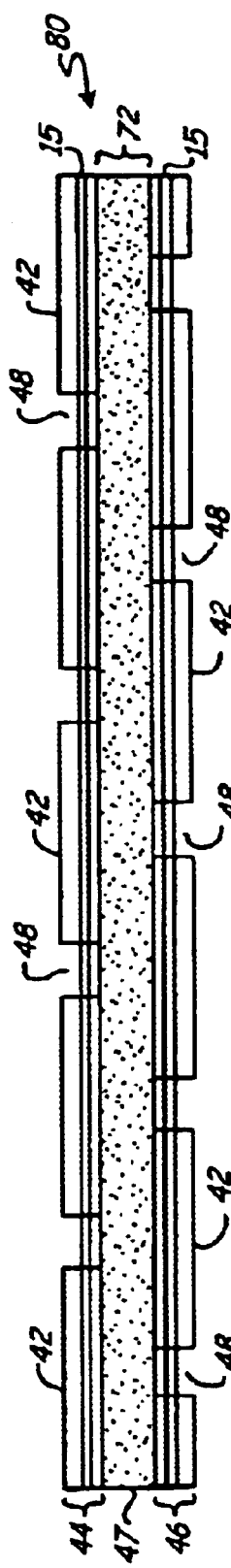

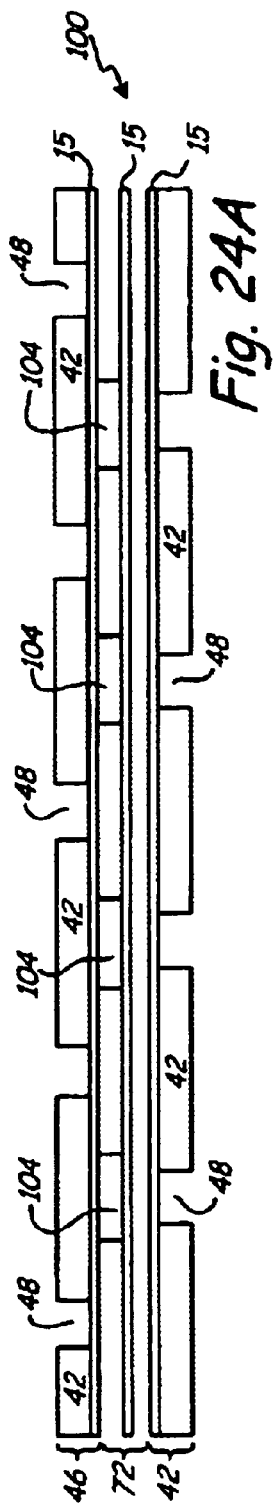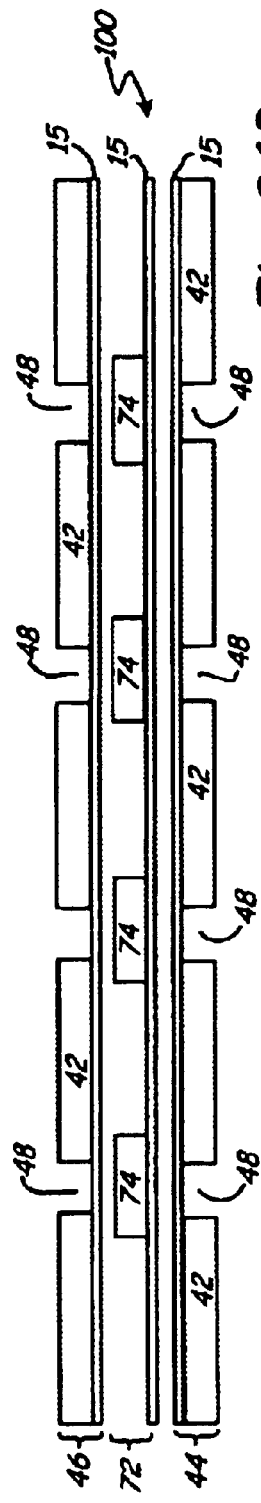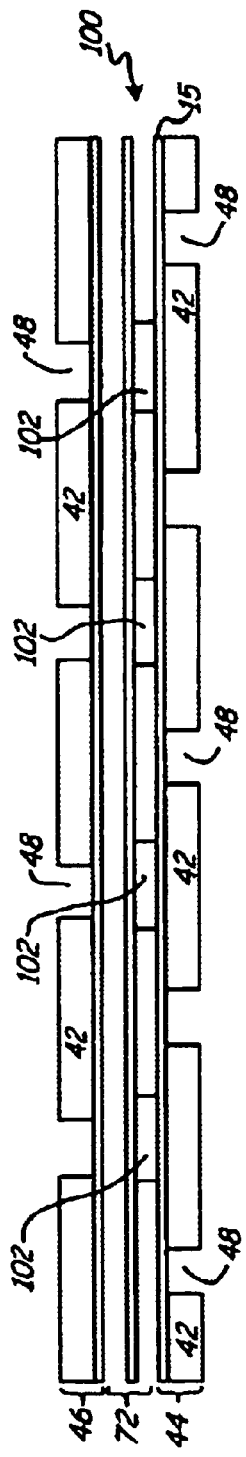

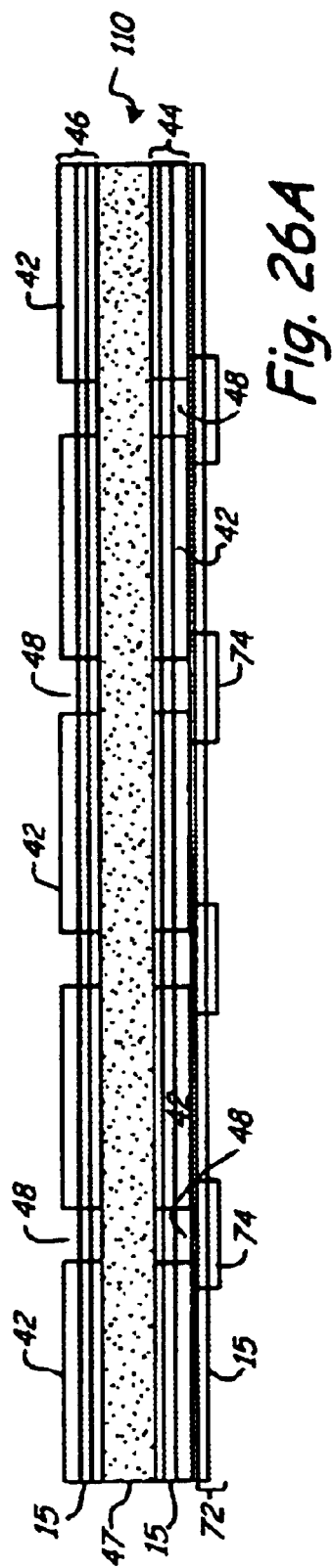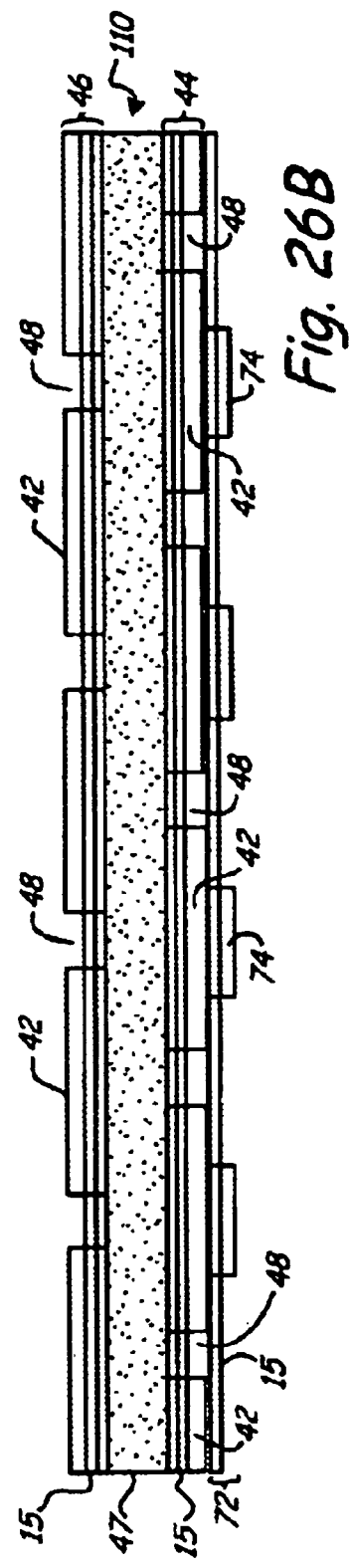

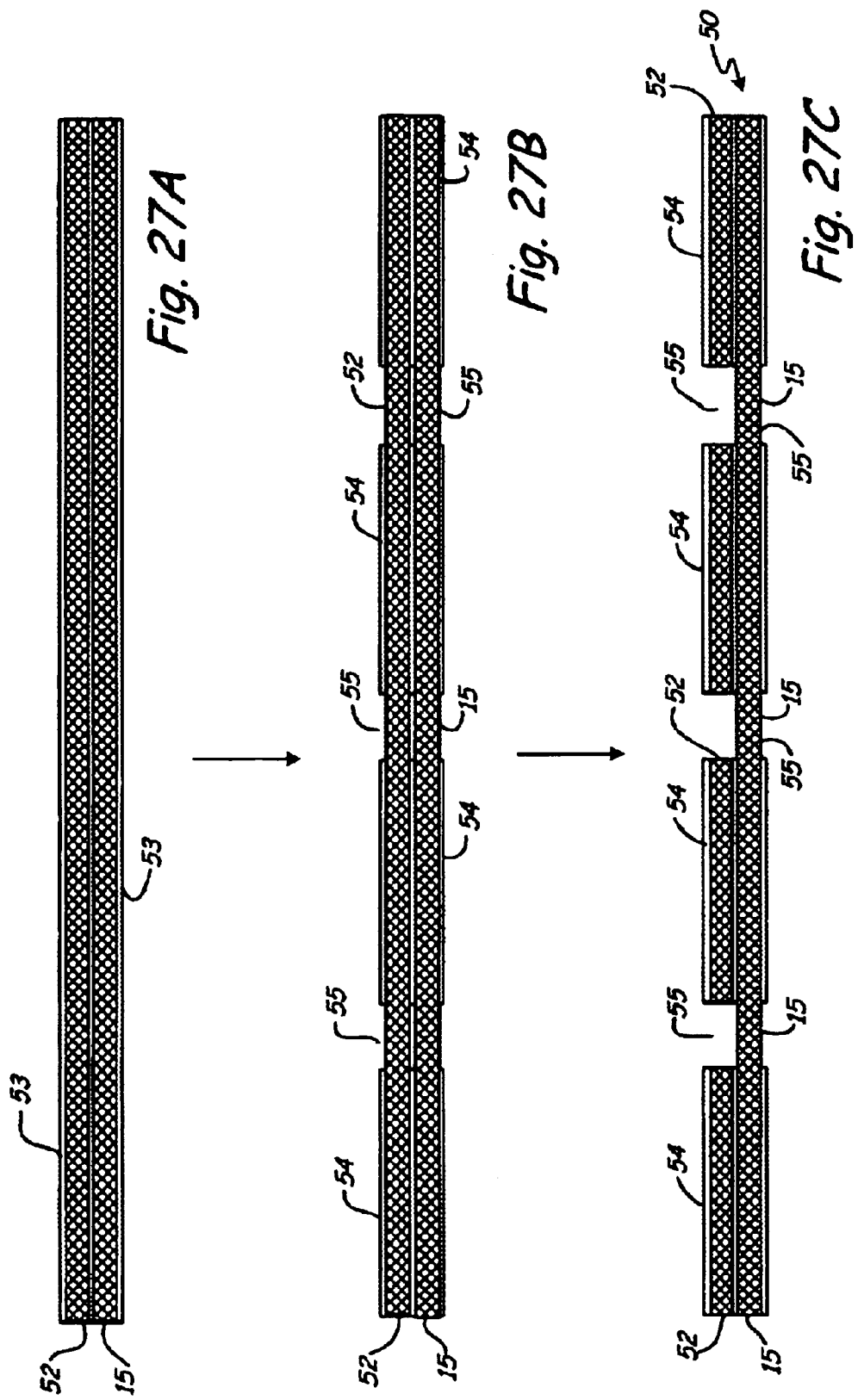

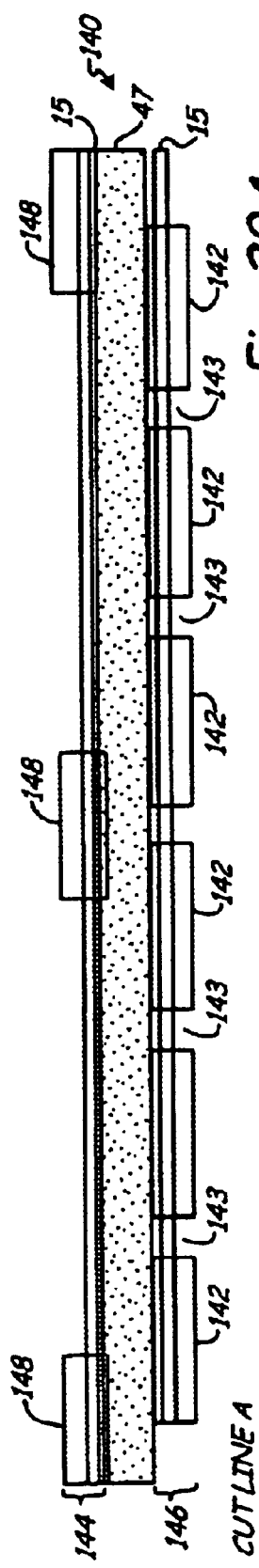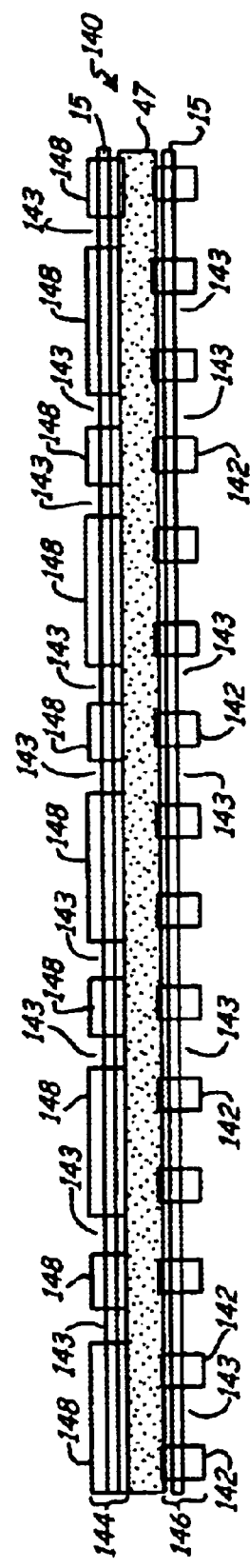

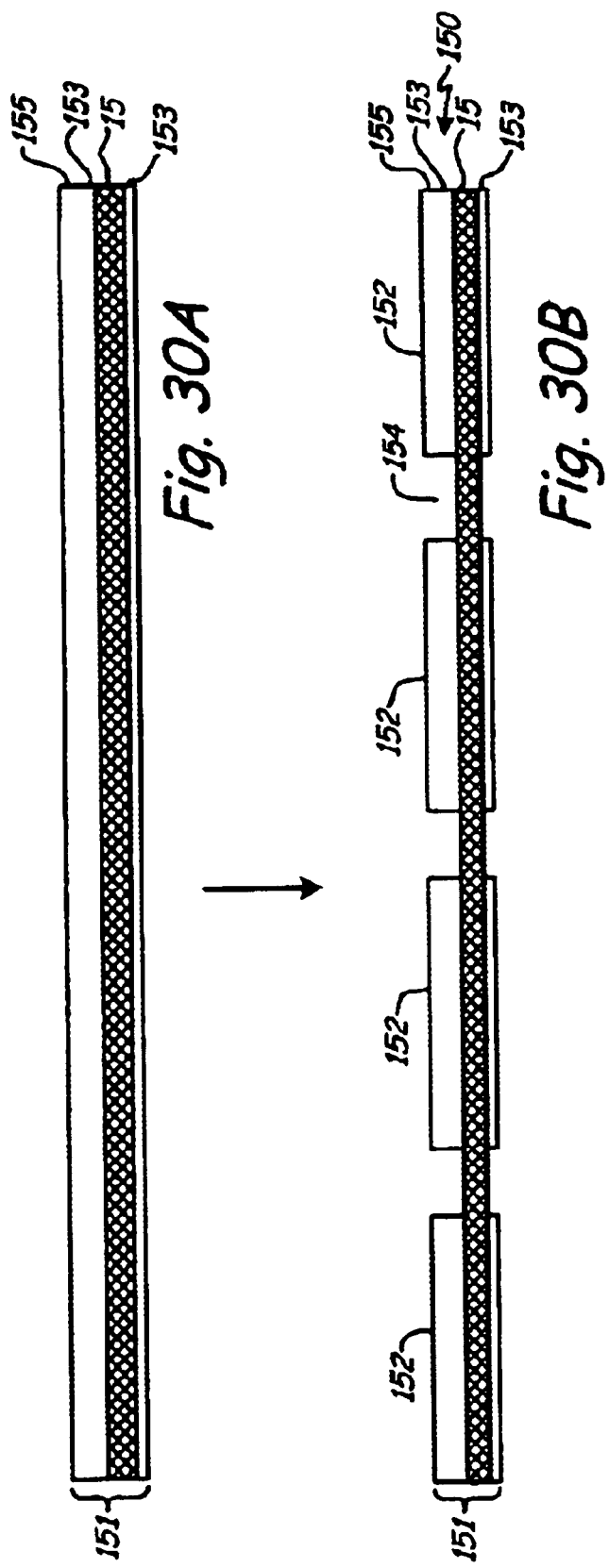

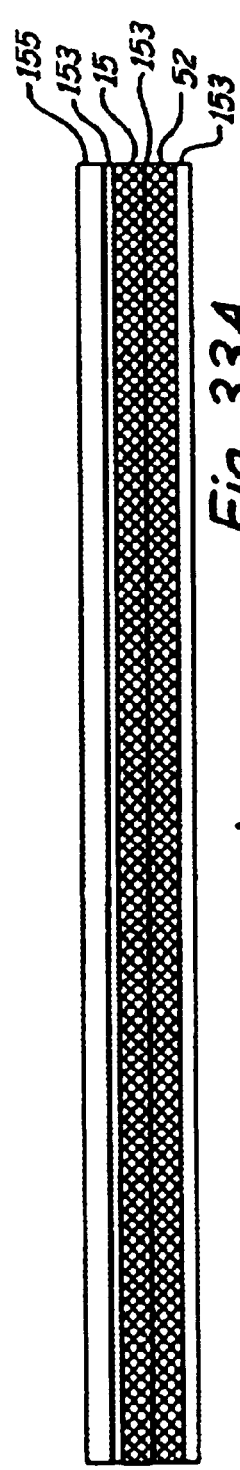
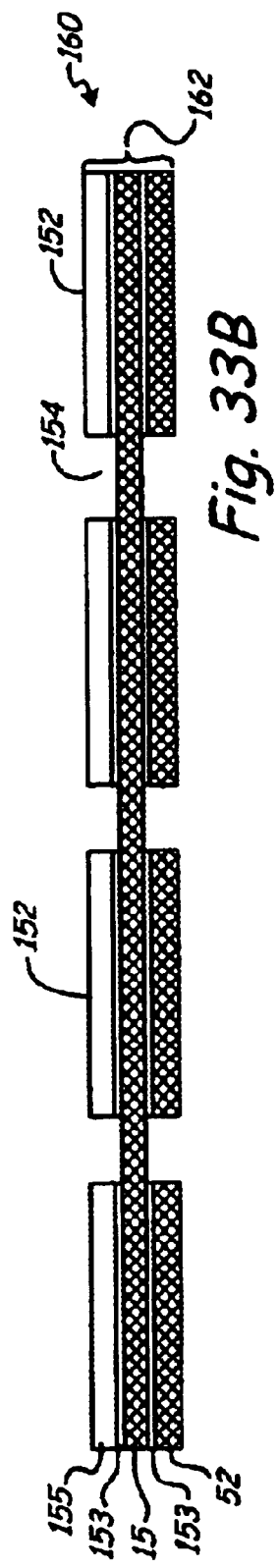

SUPPLE PENETRATION RESISTANT FABRIC AND METHOD OF MAKING

FIELD OF THE INVENTION

The fabric of this invention is primarily useful to afford excellent defense and protection against penetration forces including cutting, shearing, and slashing forces, even by jagged or serrated instruments applied at excessive force and impacts of extended duration. The inventive fabric also provides an excellent level of penetration resistance to sharp puncturing and piercing forces.

The fabric is comprised of layers, in which at least one of the layers has an array of plates. The plates in an array maintain a spaced relationship with each other by means of a material substrate.

The penetration resistant inventive fabric is suitable for fabrication of garments and protective coverings that are worn to resist cutting, shearing, slashing, puncturing, and other penetrating forces. Garments of this fabric include protective apparel, such as gloves, worn in medical, industrial, abrasive, outdoor, and other environments in which penetrating forces are experienced. Examples of penetration forces resisted by the inventive fabric include cutting by blades or saws, including high-speed rotating blades; shearing by scissors or blades; slashing by knives or sharp-edged, abrasive, or serrated objects; and puncturing or piercing by needles or pins.

BACKGROUND OF THE INVENTION

Numerous attempts have been made to fabricate penetration resistant fabrics with supple, flexible, bendable, twistable, and tactile characteristics. The cut, shear, slash, puncture, and pierce resistant fabric of this invention accomplishes each of these necessary goals. A further advantage of this invention is that it is readily adaptable for use in conjunction with conventional liquid barriers. An additional advantage of this fabric is that it can be constructed using breathable materials to increase wearer comfort, especially during extended periods of use of protective garments made from the inventive fabric.

An especially effective and highly desirable use for this fabric is for protective gloves, aprons, sleeves, footwear, and other garments. Gloves and garments constructed from the fabric of this invention find use in the medical industry where a high level of tactility is required such as gloves for surgical use. The fabric is also useful for sports people and outdoors people engaged in fishing, hunting, and similar activities. Gloves and garments constructed from the fabric of this invention are useful for protecting the wearer from industrial injuries in factories, on construction sites, in solid waste handling facilities, and in other such hazardous environments.

Due to the rising numbers of wounds from knives and other cutting instruments, there is a strong demand for an effective and user-comfortable protective barrier against these body cutting, shearing, slashing, and piercing weapons. Furthermore, public safety personnel (police officers, fire fighters, paramedics, and first responders) who must physically examine a person, a corpse, clothing, or other objects are in great need of protection from sharp objects, which might possibly be contaminated with a life-threatening to infectious organism.

Currently available, breathable protective gloves and body armor are generally of a knit or woven construction. Knit or woven construction provides minimal protection against blade cutting, such as knives. It provides even less protection against abrasive or serrated instruments, such as serrated knives, saw blades, jagged metal, or glass. And, it provides virtually no protection against puncture or piercing.

Non-porous and, therefore, non-breathing synthetics constitute the construction of some currently available protective gloves and body armor.

Such synthetics include aramids, such as Kevlar®, and polyethylenes, such as Spectra®. Such synthetics may be effective at stopping body-piercing projectiles, such as bullets, but are ineffective at resisting wounds from knives or other sharp or jagged edged objects. Such synthetics are also uncomfortable, since they prevent evaporation of perspiration from the wearer's skin.

Another advantage of the fabric of this invention is that it (i) provides dependable resistance to penetration, while (ii) allowing ease of movement due to its characteristic flexibility, bendability, and twistability, and (iii) optionally can be fabricated of breathable materials to allow evaporation of perspiration. Alternately, the fabric can be fabricated of liquid barrier materials.

SUMMARY OF THE INVENTION

The fabric exhibits properties of flexibility, bendability, twistability, and, optional stretchability, by an arrangement of layers, in which at least one layer is an array of plates connected to form a generally two dimensional sheet.

The plates are of a tough, hard, and strong substance that is not friable or brittle. The substance type and the thickness of the individual plates will differ according to its application, such as whether the fabric must be cut or penetration resistant and the level and type of force to be resisted.

The fabric is comprised of layers, in which at least one of the layers has an array of plates. The plates in an array maintain a spaced relationship with each other by means of a material substrate.

The material substrate may be a connecting material to which the plates are affixed or attached and it may become an integral part of each of the plates in the array. The connecting material interconnects the plates so that the plates are spaced apart from each other throughout the array. The connecting material also serves the important purpose of distributing any force that impinges upon the fabric or any plate or plates in the fabric among the surrounding plates, thereby taking the entire load of the impinging force off any one plate or group of plates. This property of force distribution enhances the strength of the fabric without requiring more dense plate material, thicker plate material, additional layers of plate arrays, stronger bonding materials, or other strength enhancing properties all of which reduce flexibility, tactility, bendability, twistability, and optional stretchability and increase cost. The connecting material also adds the important property of flexibility of the plate array layer by providing a highly flexible medium between the solid plates. The flexibility is due in a large measure by the fact that the connecting material provides spacing between the plates, which is referred to in this disclosure as the gap. These voids allow bending and hinging between the plates, providing suppleness to the fabric. The connecting material is sometimes referred in this description of the inventive fabric as the continuous portion of a plate layer, while the plates themselves are sometimes referred to as the discontinuous portion of the plate layer.

The material substrate may also be a base material to which the plates are affixed or attached and it may become an integral part of each of the plates in the array. The base material interconnects the plates so that the plates are spaced apart from each other throughout the array. The base material, like the connecting material (although to a lesser degree than the connecting material), may also distribute any force that impinges upon the fabric or any plate or plates in the fabric among the surrounding plates, thereby taking the entire load of the impinging force off any one plate or group of plates. The base material, like the connecting material (although to a lesser degree than the connecting material), also provides flexibility to the fabric. The base material may also be compressible in a direction perpendicular to the sheet of the base material. This property may be desirable in certain applications such as when using the inventive fabric for cleaning, scrubbing, sanding, or other abrading purposes. In these applications, the plates are able to sink into the soft base material and avoid cracking. In other words, base materials acts like a shock absorber.

The connecting and the base materials may support plates on one or both of their surfaces.

In the fabric of this invention, the base material may be combined with and provide support for one or more layers of plates interconnected with connecting material. Alternatively, a layer of plates with connecting material may support itself only or support one or more additional layers of plates with connecting material. The inventive fabric may comprise one or more base materials layered together with one or more connecting materials. The fabric may be comprised of one or more combinations of base material types and connecting material types, each with an array of plates. These layers may be in various stacked arrangements and each layer may have various plate configurations. The base material or the connecting material may be a non woven or woven fabric. The base material or connecting material may be breathable or may be a liquid barrier.

A representative method of manufacture of a fabric having a single plate layer array on a single connecting material with a single base material begins by positioning connecting material atop base material. A template of the plate layer array is then positioned atop the connecting material. A suitable substance for formation of the plates is printed onto the connecting material through the plate pattern array of the template and the template is removed. Depending on the substance of the plates, the plates may be subjected to curing or other post-patterning treatments.

If the connecting material is an elastomeric material, the degree of stretch of the fabric must be limited. If the fabric over stretches, the spacing between the plates may increase to such a degree that unwanted penetration is permitted. Several arrangements for limiting stretch are available. A non-stretchable fiber may be affixed to the elastomeric connecting material in such a way that in the fabric's unstretched state the fiber has slack. As the fabric stretches, the slack is taken up. At the end-point, where no more slack exists in the non-stretchable fiber, the fiber prevents further stretch of the elastomer. Other means of limiting over stretching involve judicious use of non-stretchable or stretch limiting connecting material at selected portions of the plate array, with due regard for the final use required for the fabric.

The inventive fabric can be fabricated to be worn on the body. Or, the fabric may be used to cover and protect an article or substrate such as cutting, shearing, or slashing instruments from sustaining damage to their sharp-edged surfaces or from causing damage to persons or their surrounding environment.

The inventive fabric may incorporate differing materials as may be necessary to meet the design, strength, dimensional, and other specifications for various applications. A particular feature of the inventive fabric is that while the plates themselves may be hard the connecting material may be highly flexible, bendable, twistable, and stretchable. In other words, the fabric has the property of being locally hard (that is the plates are hard), while retaining global suppleness across an expanse of the fabric due to the flexibility of the connecting material between the hard plates and the softness and flexibility of the base material. The inventive fabric may even exhibit relative softness and conformance to the body or article over which it is draped. The addition of a suitable liquid barrier layer or treatment of the fabric with a liquid resistant substance resists migration of fluids through the fabric.

Further objectives and advantages of the present invention will become readily apparent to those skilled in this art from the following written description of this specification. To illustrate the invention, the DESCRIPTION OF THE INVENTION section of this specification shows and describes certain embodiments of the invention. However, as will be realized, the inventive fabric is capable of numerous arrangements of its constituent elements to meet the requirements of various uses of the fabric, without departing from the scope of the present invention. For example, the fabric may use one or more layers of plate arrays. The geometry of the plates of the fabric may be identical or differ in any one layer or from layer to layer. Various laminations of plate layer arrays, base materials, and connecting materials may comprise the inventive fabric. Accordingly, the drawings and description of the invention set forth in this specification are only illustrative in nature, and not restrictive.

BRIEF DESCRIPTION OF THE DRAWINGS

FIGS. 10A and 10B are cross-sectional views of the fabric of FIG. 9, taken along the lines A and B, respectively, showing the guard plate layers interposed by a base material.

FIGS. 12A and 12B are cross-sectional views of the fabric of FIG. 11 taken along the lines A and B, respectively.

FIG. 16 is a plan view of an additional embodiment of the fabric having first and second superimposed staggered layers of guard plates.

FIGS. 17A and 17B are cross-sectional views of the fabric of FIG. 16 taken along the lines A and B, respectively, showing the layers interposed by a base material.

FIGS. 21A and 21B are cross-sectional views of the fabric of FIG. 20 taken along the lines A and B, respectively, showing the aperture plates embedded into the base material.

FIGS. 24A, 24B, and 24C are cross-sectional views of the fabric of FIG. 22 taken along the lines A, B and C, respectively.

FIGS. 26A and 26B are cross-sectional views of the fabric of FIG. 25 taken along the lines A and B, respectively.

FIGS. 27A, B, and C are cross-sectional views of a further embodiment of the fabric of this invention comprising guard plate arrays having integral metal wire-mesh reinforcement.

FIGS. 29A and 29B are cross-sections of FIG. 28 taken along lines A and B of FIG. 28, respectively.

FIG. 30 is a cross-sectional view of another embodiment of the fabric of this invention comprising a metal guard plate layer.

FIG. 33 is a cross-sectional view of a fabric that is a hybrid of wire-mesh and metal guard plate fabric embodiments.

DESCRIPTION OF THE INVENTION

Introduction

Figure 1:
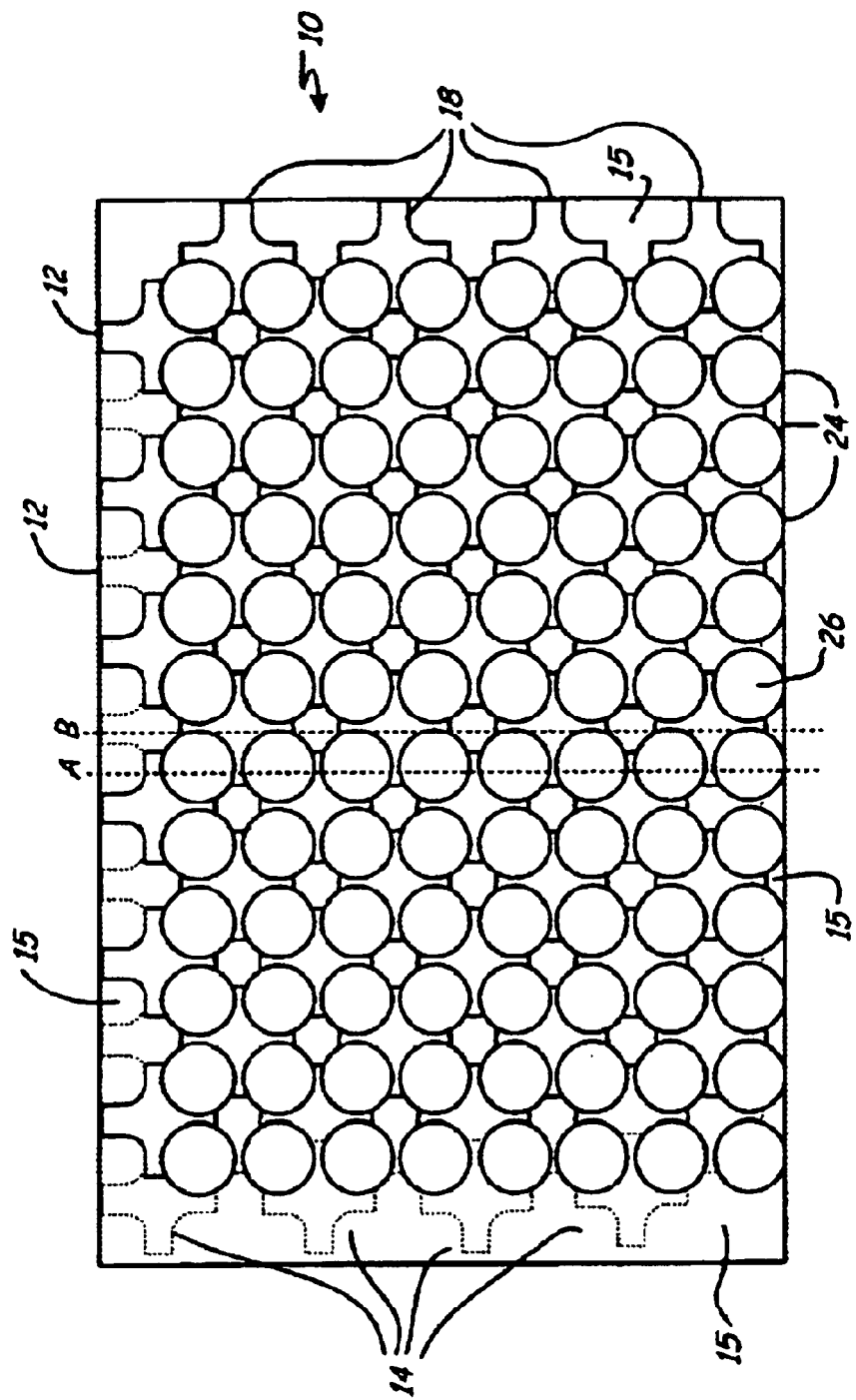
FIG. 1 is plan view of a fabric embodiment having a stack of layers, a first and lowest layer of guard plates; a second superimposed staggered layer of guard plates on top of the first layer of guard plates; and a third exterior layer of aperture plates on top of the second layer of guard plates, which together cover the entire fabric area.

A primary objective of the present invention is to provide a fabric with superior penetration resistance, while at the same time maintaining a high degree of fabric flexibility. Depending on the intended application, the fabric can also be constructed to provide abrasion-resistance, abrasiveness, enhanced grip characteristics, breathability, and other desirable characteristics.

Explanation of Terms

To assist with the understanding of the inventive fabric, an explanation of some of the terms used in this disclosure is provided. The explanation of the terms is not intended to be either a definition or an exhaustive explanation of those terms. A full understanding of those terms is to be garnered from the explanations, the entire written description of the invention, the drawings, and the claims set forth in this disclosure in conjunction with the common understanding of those terms by one skilled in the art.

"Aperture" refers to an area of the fabric not covered by any plate when two or more plate layers are superimposed on each other or, in other words, it is an area of overlapping gaps in a fabric having two or more plate layers superimposed on each other.

"Aperture plates " are plates that usually have a smaller area and cover a smaller expanse of the fabric than guard plates. Generally, aperture plates are positioned to cover apertures not covered by superimposed guard plate layers.

"Base material " refers to a sheet-like material that is generally a non-woven fabric. A layer with connecting material may be supported on a base material. The base material provides resistance to fabric tearing and over all strength to the fabric. The base material may be selected for, among other characteristics, flexibility, strength, bonding characteristics with the plate substance, compressibility, liquid impermeability, chemical resistance, breathability, and washability depending on the use of the final product made from the inventive fabric. The base material provides horizontal and optional vertical integration to the fabric. When the plates are established on the base material, whether or not the base material supports a connecting material, the base material allows the substance of the plates to penetrate into the base material and/or to adhere to the base material. The base material may be, but need not be, penetrated by the plate substance to achieve optimum bonding with the plates. Examples of suitable materials for base material are nylon, polyester, polyaramide, acrylic, and cellulose material.

"Connecting material " refers to a porous flexible material. It may be a loosely woven fabric or a web of fibers or bands. For certain fabrics of this invention, an array of plates is established on a connecting material. For certain inventive fabrics, the connecting material may be supported on a base material. A representative example of a suitable connecting material is polyester chiffon. The connecting material is selected for its porosity and flexibility. It is also selected for its ability to provide a connection between plates in a layer and for its ability to enhance the resistance of a plate to debonding stresses exerted on the individual plate by spreading the debonding forces throughout the array of plates rather than concentrating the debonding forces on a single plate or a few plates. When the plates are established on the connecting material, whether or not the connecting material is supported on a base material, the connecting material allows the substance of the plates or the bonding of the adhesive for the plates to penetrate through the connecting material.

"Fabric" refers to the inventive fabric of this disclosure. It is an arrangement of at least one layer, in which the layer is an ordered array of plates. Each plate array is maintained and stabilized in position by a material. Each plate array may be established on a connecting material, on a base material, or on a connecting material supported on a base material.

"Gap" is an area in a plate layer that is not covered by plates.

"Guard plates" are plates that usually have a larger area and cover a larger expanse of the fabric than aperture plates.

"Layer" refers to an array of plates embedded in connecting or base material. In a plate layer, plates are not directly connected to each other. The connecting or base material maintains the positions of the plates relative to each other in an array and maintains the gap between adjacent plates.

"Plate" refers to an individual plate-like object. A plate may have any suitable shape. A plate is generally planar, but need not be. In a penetration resistant inventive fabric, the plates are constructed of a penetration resistant substance. The plates may optionally have other characteristics, such as enhanced grip and abrasion resistance. The term plate refers to both guard plates and aperture plates.

"Registration" refers to superimposing, or stacking, two or more plate layers in proper relative positions to each other so that the penetration resistant fabric provides maximum cut and puncture resistance against needle-like or knife-like objects. Generally, plate layers are superimposed on each other to minimize the size and spacing of apertures of the fabric.

"Substance" refers to the stuff, matter, or constituent component of which the plates are constructed, as exemplified by an element, compound, alloy or composition. The substance may be tough, hard, and strong, and not friable or brittle depending upon the application. The substance type and the thickness of the plates will differ for needle penetration resistance, for cut resistance, and for resistance to other forces depending on the encountered level of force.

Principles of Invention

A typical embodiment of the fabric of this invention contains multiple layers of guard plates with the guard plates in each layer connected to a base material or to a base material and an overlay of connecting material. The guard plates are manufactured of a substance selected for its resistance to penetration and optionally for added features of grip enhancement and abrasion resistance. The base material provides overall strength to the fabric, including resistance to tearing and overstretching. It is selected for its flexibility as well as its strength, for its ability to bond with the plate substance, and for other desirable features. Other characteristics may be important for the base material, such as breathability and washability, depending on the use of the final product made from the inventive fabric. The connecting material is selected for its porosity and flexibility. It is also selected for its ability to provide a connection between plates in a layer and to for its ability to enhance the strength of the bond between the plate array and the base material.

The composite nature of the inventive fabric makes it possible to realize locally (that is at the plate level) hard, puncture, and cut resistant plate features. At the same time, the fabric may exhibit global (that is overall) softness and flexibility due to the degree of softness and flexibility of the base material and the connecting material chosen for a particular application.

By judicious selection of substances, the fabric of this invention can resist a wide range of sub-ballistic forces. The fabric is not designed to resist ballistic forces due its inherent design. The large size and extremely high speed of a ballistic force dictates that ballistic impact involves a large degree of fiber tensile extension and stress wave energy dissipation over an area much larger than the size of a bullet. This makes it critically important that ballistic resistance materials must use fibers with high tensile strength, modulus, and energy to break. A similar situation occurs in puncturing of a fabric by a blunt probe. If the tip size of the blunt probe is sufficiently large, the dominant mode of penetration is stretching and breaking of fibers in the fabric. In the process of needle penetration through a fabric, the sharp tip of a needle can penetrate fabric simply by opening up gaps between weaves. A needle penetration process, therefore, does not necessarily involve tensile extension and breaking of fabric fiber. The design philosophy must be fundamentally different.

To provide penetration resistance, one approach is to have a high level of coverage by penetration resistant plates to increase the probability that a needle or other penetrating instrument will encounter puncture resistant plates. The fabric of this invention will provide 100% plate coverage with three layers of plates. The term "plate" refers to both guard plates and aperture plates. Typically, the three plate layers must also be sized and positioned correctly in order to achieve 100% coverage. The fabrics illustrated in FIGS. 1–4, FIGS. 5–8, FIGS. 11 and 12, FIGS. 18 and 19, FIGS. 20 and 21, FIGS. 22–24 and FIGS. 25 and 26 are all three-layer assemblies. These three-layer assembly fabrics achieve 100% plate coverage in a direction perpendicular to the fabric surface.

FIGS. 9 and 10, FIGS. 13–15, FIGS. 16 and 17, FIGS. 28 and 29, FIGS. 31 and 32 are two-layer assemblies. Although, plate coverage of the fabric surface with a two-layer assembly is not 100%, the open area fraction of the fabric can be limited to only a few percent. This is done by adjusting the ratio between plate and aperture size, the position of the aperture, and by offsetting the two plate layers to minimize aperture size. For example, in the equilateral hexagon guard plate array of FIGS. 9–10, the hexagon guard plate minor diameter is 80 mils and the gap between adjacent guard plates is 12 mils. The result is that the open area of the registered two-layer fabric assembly is about 3.4%. Additionally, adjusting the gap size between adjacent plates in a layer can reduce the size of apertures in a two-layer fabric to be smaller than the diameter of a needle probe. Aperture size minimization has the benefit of increased puncture resistance at the aperture-locations. As compared to three-layer assemblies of the inventive fabric, two-layer assemblies cost less to manufacture. Achieving and maintaining the optimal registration is important for two layer fabric assemblies. For example, the aperture-size for hexagon plates tends to fluctuate a significantly for differing registration of layers in an assembled fabric.

FIGS. 27 shows a method of making a reinforced guard plate layer using wire mesh. Typically, the wire mesh would be metal, but other substances may be used depending upon the application. The fabric of FIG. 27 is fabricated using wire-mesh as reinforcement for the polymeric guardplates. The wire mesh is embedded in the guard plate resin before the resin sets. The process includes placing the wire mesh on a connecting material, pouring the guard plate resin over the wire mesh-connecting material combination, placing a photo mask patterned in the form of an array of guard plates over the wire mesh-connecting material combination so that the photo mask pattern has openings in the guard plate locations, curing the guard plate resin with ultra violet light, washing away the uncured resin between the guard plates (in the gaps), and etching away the exposed metal mesh between (in the gaps) the guard plates. The fabric produced by this process has an array of metal wire mesh reinforced guard plates connected together by connecting material, which extends between the gaps and through the guard plates.

In this disclosure, embodiments of the inventive fabric are sometimes referred to by the designation SF12, SF12, SF13, and so forth for ease of reference.

An octagon-and-square plate array has the benefit of much reduced sensitivity in fluctuation of the aperture-size when the registration of layers is away from its predetermined initial position, which allows for a larger registration tolerance. For example, in the equilateral octagon-and-square guard plate two layer array of FIGS. 16 and 17 (SF18), the octagon guard plate minor diameter is 80 mils and the gap between adjacent guard plates is 12 mils. The open area of this registered two-layer fabric assembly is about 3.4%, identical to that of the two layer hexagon array of the fabric of FIGS. 9 and 10 (SF15). However, the size and density of apertures in the multi-layer fabric for SF15 and SF18 are different. The SF18 two layer octagon-and-square array has smaller but more numerous apertures than the SF15 two layer hexagon array. For the same guard plate and aperture sizes, the individual aperture size in the SF18 fabric is about 80% smaller and more numerous than the apertures for the SF15 fabric.

A polymer resin is suitable for use as the plate substance for the inventive fabric. In choosing a polymeric resin as a plate substance, it is important to ensure a strong bond between the polymer resin and the base material. A suitable polymer resin for construction of the plates is a one-part heat-curable epoxy resin formulated to (i) provide puncture and cut resistance appropriate to the application of the fabric, (ii) be screen printable, (iii) be flexible and yet strong, (iv) bondable to the base material, and (iii) have good shape definition during printing and curing. Such resins are readily formulated to meet these criteria and are available from, for example, Fielco Industries, Inc., 1957 Pioneer Rd., Huntingdon Valley, Pa. 19006, which has formulated a resin that meets the characteristics set forth in this paragraph and has given it the designation: TR21. And TR84. A suitable base material is a non-woven polyurethane and nylon synthetic leather, such as Amara®, available from Clarino America Corp., 489 Fifth Ave., 31$^{st}$ Floor, New York, N.Y. 10017. Other suitable materials include woven or non woven materials, nylon, polyester, polyaramide, acrylic, cellulosic, and similar materials.

The guard plates and the aperture plates are very thin and of a substance chosen to resist a penetration force equivalent to that exerted by a cutting force of the level and type for which the fabric is to be used and for which it is designed.

It has been known that, if polymer resin plates are printed directly onto a base material, they tend to debond easily when the plate is subject to shear or abrasion forces during use. However, it has been unexpectedly discovered according to this invention that, if a layer of connecting material is laid on the base material before establishing the plate layer array, the bonding between the plate layer and the base material is markedly improved. For example, a connecting material is arranged atop a base material. A plate layer array is established by placing a template of the plate layer array atop the connecting material and printing the plate layer array with a suitable polymer resin. The polymer resin completely penetrates through the connecting material and continues to penetrate through a surface portion of the base material. The connecting material thus becomes an integral part of the plate layer array. Due to the interconnection between the individual plates of the array by the connecting material as an integral part of the plates and of the plate layer array, any force exerted on the fabric surface that would tend to debond an individual plate is dissipated by the connection of the individual plates to each other through the connecting material.

A connecting material may be any porous and flexible material, which may also be characterized as a web. The connecting material may be any such material into which the plate material may be integrally bonded. A suitable connecting material is any typical commercially available polyester chiffon. The connecting material spreads any force, including an abrasive force, applied to the surface of the fabric between neighboring plates. The lateral connection afforded by the connecting material reduces the debonding stress borne by each individual plate. The connecting material is chosen for its ability to provide an interconnection between plates in a layer, and for its ability to enhance the strength of the bond between the plates and the base material. Because the plates are formed onto and through the connecting material, the presence of a connecting material has the added benefit of re-enforcing each plate with a continuous fiber network. When a connecting material is used together with a base material, the fabric demonstrates enhanced puncture and cut resistance.

Figure 32:
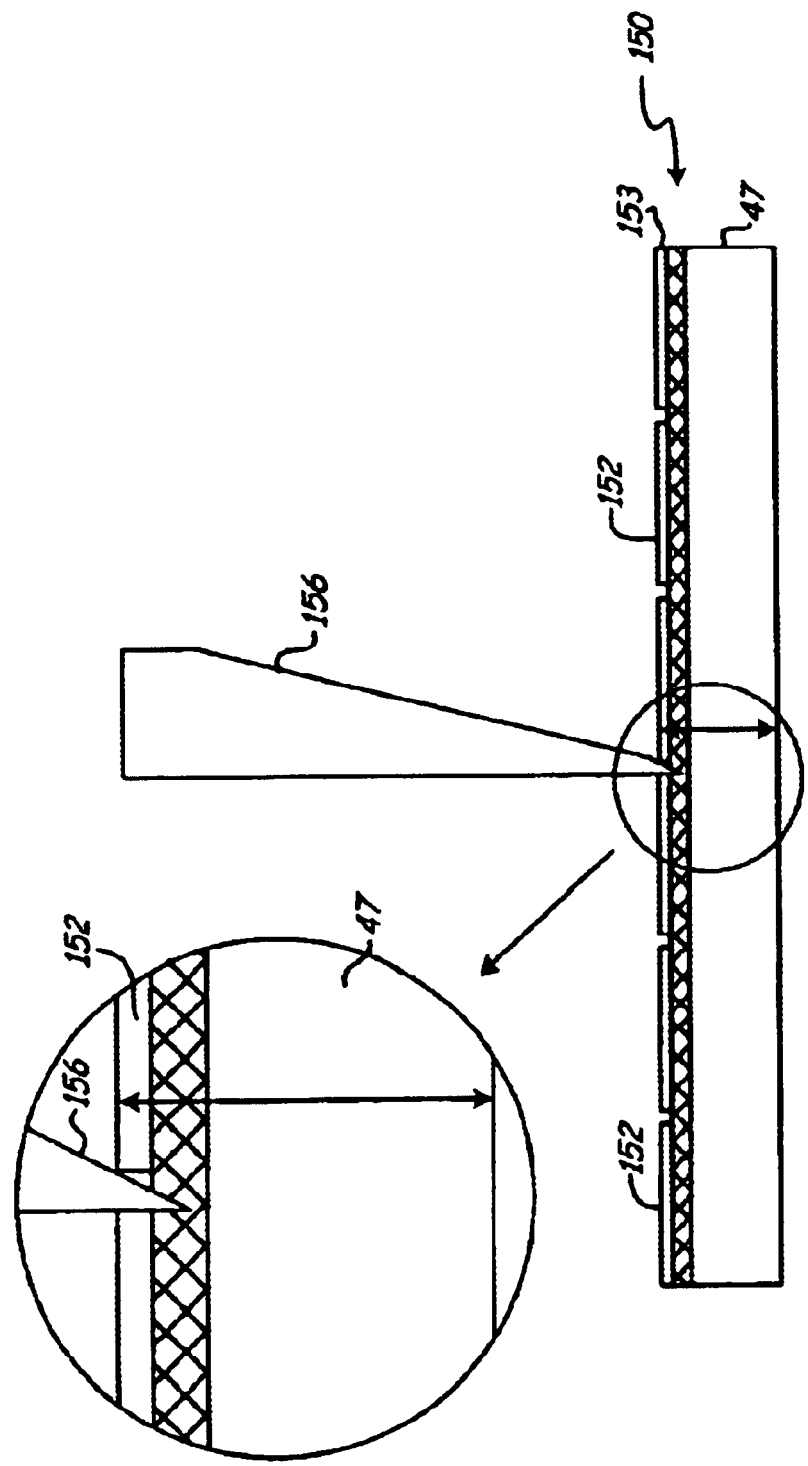
FIG. 32 illustrates a 21G medical needle impinging upon a metal guard plate fabric embodiment.

Fabrics according to the present invention are able to provide needle puncture resistance, against a needle impinging upon the fabric at an angle of approximately 90° to the fabric surface and at angles substantially less than 90°. The potential for penetration can be greater from a low-angle needle or similar probe. A low-angle needle may have a greater tendency to lift a plate off the fabric surface or to penetrate through an aperture and then below the top fabric layer. Maintaining a minimal gap size between plates, a minimal open area in superimposed layers, and a minimal vertical distance between layers of the fabric enhances penetration resistance against even low-angle penetration. FIG. 32 depicts a needle of the type used for medical applications being stopped by one embodiment of the fabric after only a slight penetration between the metal plates of the fabric. The minimal gap size depends upon the material used for the guard plate and the thickness of the guard plate. Generally, the gap size should not be smaller than the guard plate thickness to maintain flexibility. The thickness of guard plates range from 5–20 mils for polymers and 1–5 mils for metal. The vertical distance between layers should be below a couple of mils to lower the probability of angle penetration while still maintaining adequate adhesive bonding strength between layers.

The various characteristics of the fabric of the invention must be in balance with each other to ensure the desired global flexibility of the fabric.

Another approach to achieving penetration resistance is to use just one layer of penetration resistant plates. This approach has the advantage of potentially greater fabric flexibility and simplicity in manufacturing than the multi-layer approach. The absence of multiple layers of plates leaves a higher percentage of gap space in comparison to the multi-layer approach. However, when the gap size is narrowed sufficiently in relation to the typical probe tip geometry and dimensions, a significant level of penetration resistance may be expected even at the gap locations.

FIG. 32 shows an example of a one-layer puncture resistant fabric using metal guard plate. Here a layer of closely spaced metal guardplates is bonded to a substrate through a flexible adhesive. The substrate can be a base material or a combination of a connecting fabric and a base material. The advantage of using metal as guardplate material is that the plates can be extremely thin while still providing a high level of penetration resistance. For example, upon static loading, a 2-mil thick 304 stainless steel sheet is puncture proof against a 21 gauge medical needle because the needle fails before the metal does. This allows the gaps between guardplates to be as narrow as two mils without sacrificing overall fabric flexibility.

The tip of a 21 gauge medical needle is cut at an angle of 26 degrees as is shown in FIG. 32. This means that for every 2 mils the needle penetrates into a material, the dimension of its cross section widens by 1 mil. If a 21 gauge medical needle hits directly at a 2-mil wide gap (FIG. 32), the tip will penetrate 4 mils when it encounters the edges of two metal guardplates. To advance further, the needle needs to either (i) deform or delaminate the metal plates or (ii) stretch the substrate underneath. Otherwise, it will be jammed by the metal guardplates. Deforming metal plates would incur substantial resistance. If the substrate is designed to strongly resist stretching, and a strong adhesive is used to bond metal to the substrate, a high level of penetration resistance can be expected for the one-layer fabric. The substrate provides two functions here: it acts to maintain the overall integrity of the fabric in the lateral dimensions and it provides the cushion in the thickness direction to insure that the needle will encounter significant resistance before it penetrates the entire fabric.

A two-step process of lamination (bonding) and etching is used to make a one-layer fabric with metal guardplates. A metal sheet (e.g. 2–5 mil thick stainless steel) is bonded to a flexible substrate (such as chiffon fabric and synthetic leather Amara) with a flexible bonding agent (e.g. polyurethane). Photo resist films are applied on both sides and the metal is etched to leave disconnected guardplates. The etching technology can control the gap size with precision down to the thickness of the metal sheet. This produces the combination of extremely strong guardplates with very narrow gaps.

One hundred percent plate coverage is not as important for cut resistance as for puncture resistance. For a cut resistance fabric it is important that the plates be made of a cut resistant material. Metal, ceramic, and polymer resins re-enforced with mineral or metal particles are examples of good cut-resistant substances for the plates of this inventive cut resistant fabric. A suitable polymer resin is a one-part heat-curable epoxy resin, which can be formulated, to meet the needs of various fabric applications, by Fielco Industries, Inc., 1957 Pioneer Rd., Huntingdon Valley, Pa. 19006 (as previously stated, designated by Fielco as TR21) or a metal-filled or mineral-filled epoxy putty, such as Devcon Plastic Steel® Putty (A), manufactured by ITW Devcon, 30 Endicott St., Danvers, Mass. 01923.

Figure 9:
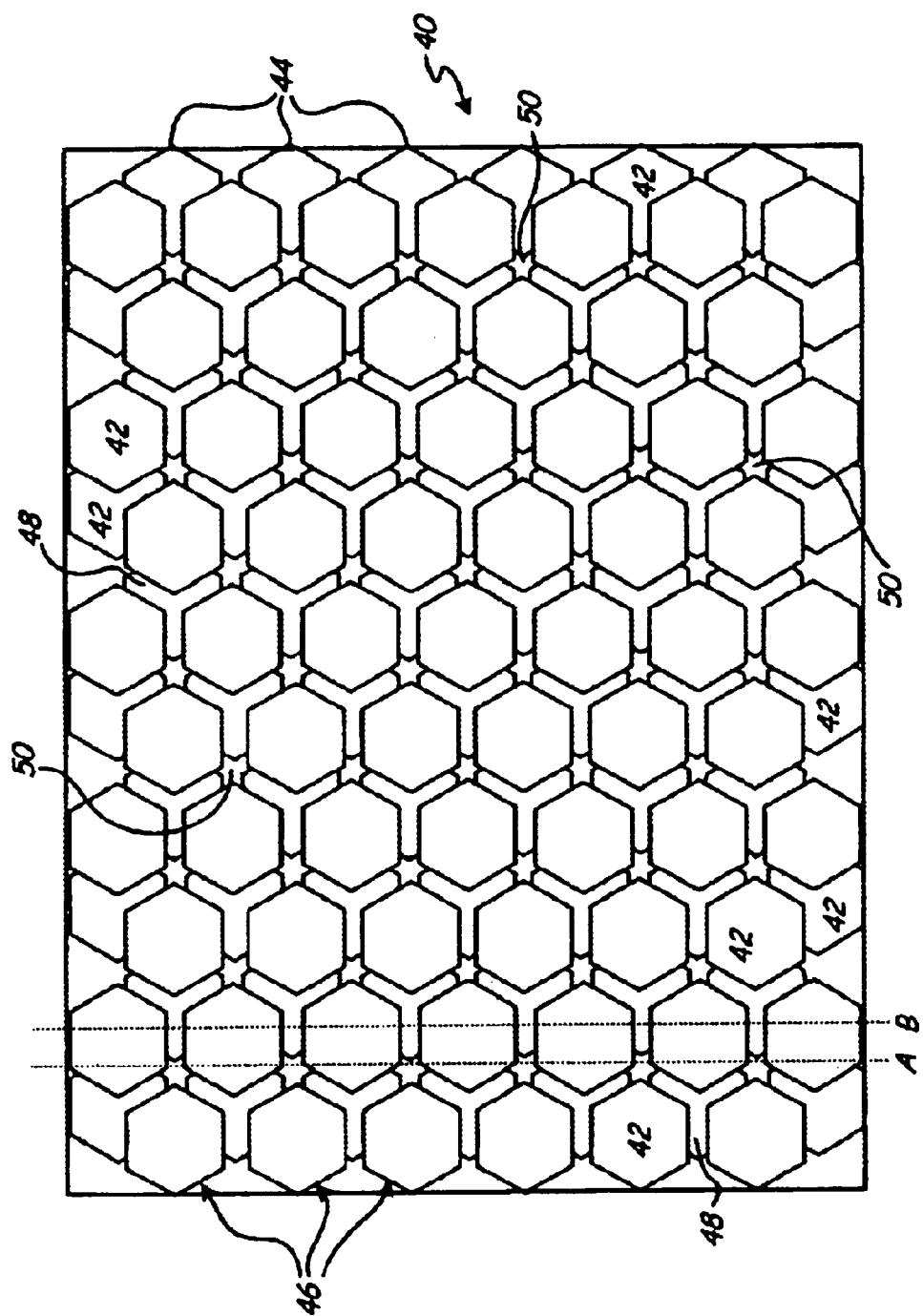
FIG. 9 is a plan view of another embodiment of the fabric having first and second superimposed staggered layers of guard plates.

It is also important for cut resistance that there are no straight-line areas of the fabric that are uncovered by plates. Therefore, this is a determining factor in the choice of the (i) patterns of the plates, (ii) shape of the plates, (iii) size of the plates, and (iv) size of the gap between the plates. All of these interrelated factors must be controlled in the design of a fabric embodiment to assure that there are no straight lines of exposed, uncovered fabric, that is, no straight lines of fabric that are uncovered by plates. A hexagon pattern, for example, as seen in the guard plate layers of FIG. 9, provides a good example where the ratio of plate to gap size is satisfactorily large.

Flexibility is another important attribute for a successful fabric of this invention. In a multi-layer fabric, each plate layer must be flexible. The flexibility of the base material and connecting material, the plate geometry and size, and the aperture size between plates all contribute to the flexibility of the fabric. A critical control factor to the overall flexibility of the inventive fabric is the integration of layers, that is, the position of the layers superimposed on each other and the position, density, and substance of the bonding agent. The cured bonding agent must remain flexible. In the SF11 (FIGS. 1–4) and SF12 fabrics (FIGS. 5–8), bonding the layers at the spots indicated achieves maximum flexibility for fabrics with the illustrated plate arrays. Note that with the bonding schemes illustrated in FIGS. 1–8, adhesives do not connect plates together in different layers. The adhesives interconnect solely between connecting and/or base material of different layers. This arrangement enhances and maximizes flexibility of the fabric. Typically, a two-layer fabric of this invention is more flexible than a three-layer fabric. The presence of additional layers in the fabric increases the penetration resistance, especially to low angle penetration. However, the presence of additional layers requires more precise registration between the layers to maintain minimal aperture size between the plates in the multi-layer fabric. Relative motion between layers and plates is decoupled to allow maximize overall flexibility. The decoupling is largely due to the flexibility of the connecting and/or base material. Both of these materials allow stretch of each of the respective layers of the fabric. The bonding limits the stretch of one layer relative to another, but not to a degree that inhibits the desired flexibility of the multi-layered fabric due to the fact that the bonding does not occur between plates in adjacent layers, but between connecting and/or base material.

In fabrics such as SF15 (FIGS. 9–10), SF17 (FIGS. 13–15), and SF22 (FIGS. 18–19), a base material of a certain thickness provides a support for different plate layers. A connecting material maintains the guard plates of each layer in position relative to each other. The thickness of the relatively soft base material functions as a cushion to limit interference between the motion of plates in the layers separated by the base material, which increases fabric flexibility.

The fabric of this invention can also be constructed to provide a liquid barrier. If the fabric uses a base material, the base material itself can be liquid proof or can be treated with any suitable commercially available liquid-proof coating, such as silicone and polyurethane. Alternatively, the fabric itself can be constructed with an additional liquid proof barrier layer, such as latex or polyurethane.

Depending on the environment within which the fabric of this invention is used, breathability may be another important characteristic of the fabric. A fabric constructed with layers using only connecting material is inherently breathable, because the connecting material in the gaps between the plates is very porous. For fabrics constructed with layers using a base material, the fabric is breathable if the base material is chosen to be breathable.

The local (hard) and global (supple) properties of the fabric facilitate incorporation of other desirable features into the fabric, in addition to the penetration resistant features described above. For example, polymer resins for the plates can be chosen to maximize static friction between the fabric and wood, steel, fish, glass, or other surfaces. Static friction is particularly important in gloves for industrial uses and outdoor sport uses where grip is an important consideration. Coating the polymer resin plates with a high coefficient of friction material can further increase grip strength. Therefore, gloves can be customized for each specific application by choosing a plate material to suit the frictional needs of the application. Resins may be readily formulated to meet a variety of high grip strength applications. Fielco readily formulated a resin that provides good grip for stainless steel surfaces. Devcon provides a good resin for galvanized steel surfaces. Another example of a useful product of the fabric of this invention is a flexible cleaning cloth with specialized imprinted plates designed for optimum abrasiveness. For example, a polymer with a metal filler may be used to provide an abrasive surface. An abrasive fabric of this invention may be a single plate layer array established on base material with connecting material overlay. A glove, mop, cloth, pad, or similar item fabricated of such a fabric is suitable for cleaning relatively hard surfaces. Such an abrasive fabric may also serve for wet or dry sanding. Again, the abrasion characteristics of the plates and the flexibility of the base material of the inventive fabric can be separately optimized according to the use characteristics desired in the final product. The suppleness and compressibility of the base material has been found to be of particular importance for design of a fabric used for abrasive purposes. As the abrasive fabric moves across the surface to be abraded, the individual plates are allowed to compress into the base material and thereby conform to the deviations in the abraded surface. Without this compressibility feature, the abrading fabric would not be as efficacious in its ability to smoothly move over the abraded surface and perform function whether it be cleaning or sanding.

Detailed Description of the Fabric Structure

The following detailed description of the structure of various embodiments of the penetration resistant fabric of this invention enables any person skilled in the art to make and use this invention and sets forth the best modes contemplated by the inventor for carrying out the invention. Various modifications of the described embodiments of the inventive fabric, however, will be readily apparent to those skilled in the art because the principles of the present invention are defined in this written description.

In this disclosure, embodiments of the fabric are sometimes referred to by the designation SF11, SF12, SF13, and so forth for ease of reference.

Figure 2:
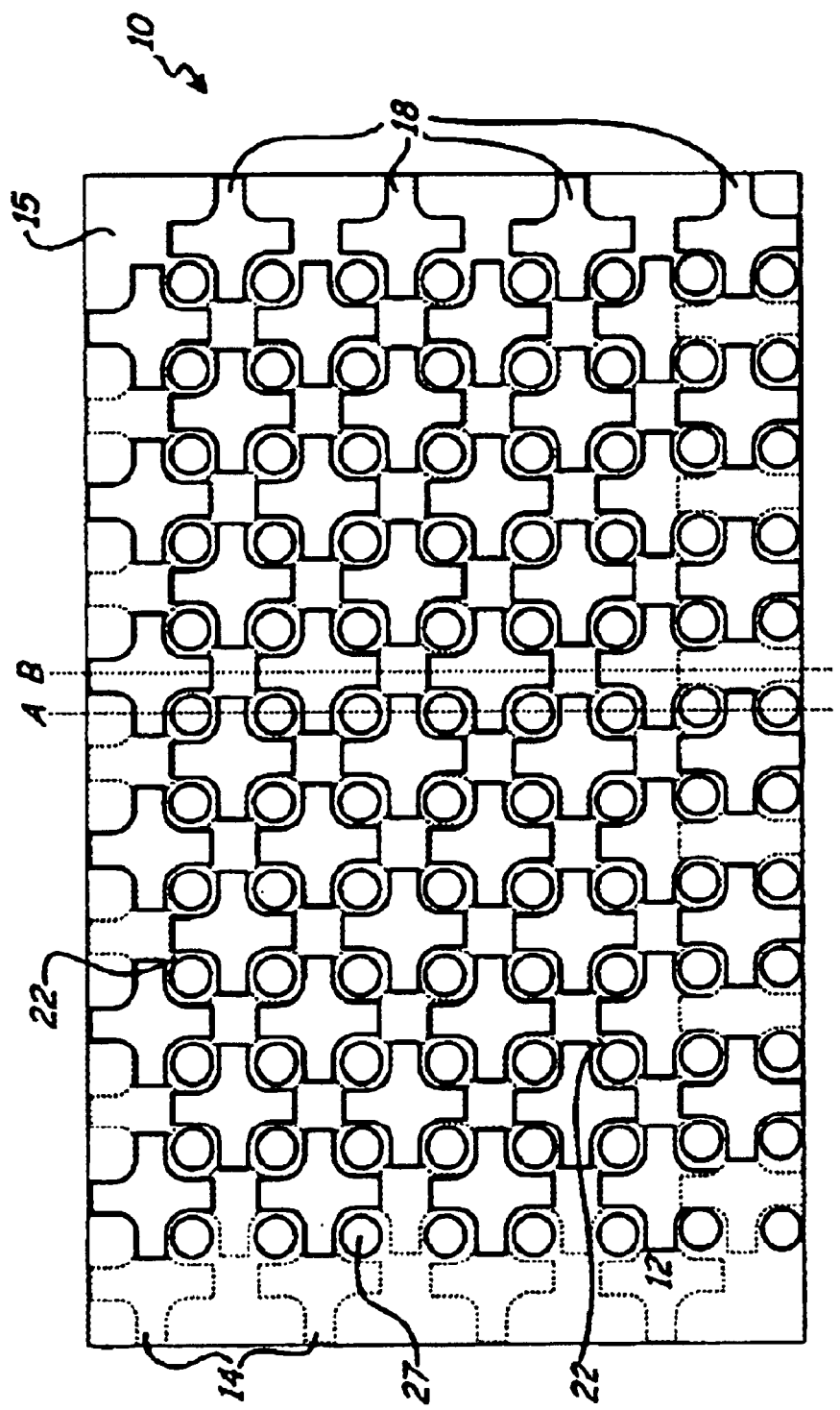
FIG. 2 is a plan view of the fabric of FIG. 1 showing only the first and second guard plate layers and the position of bonding spots for bonding the aperture plate layer, but not showing the third exterior layer of aperture plates.
Figure 3:
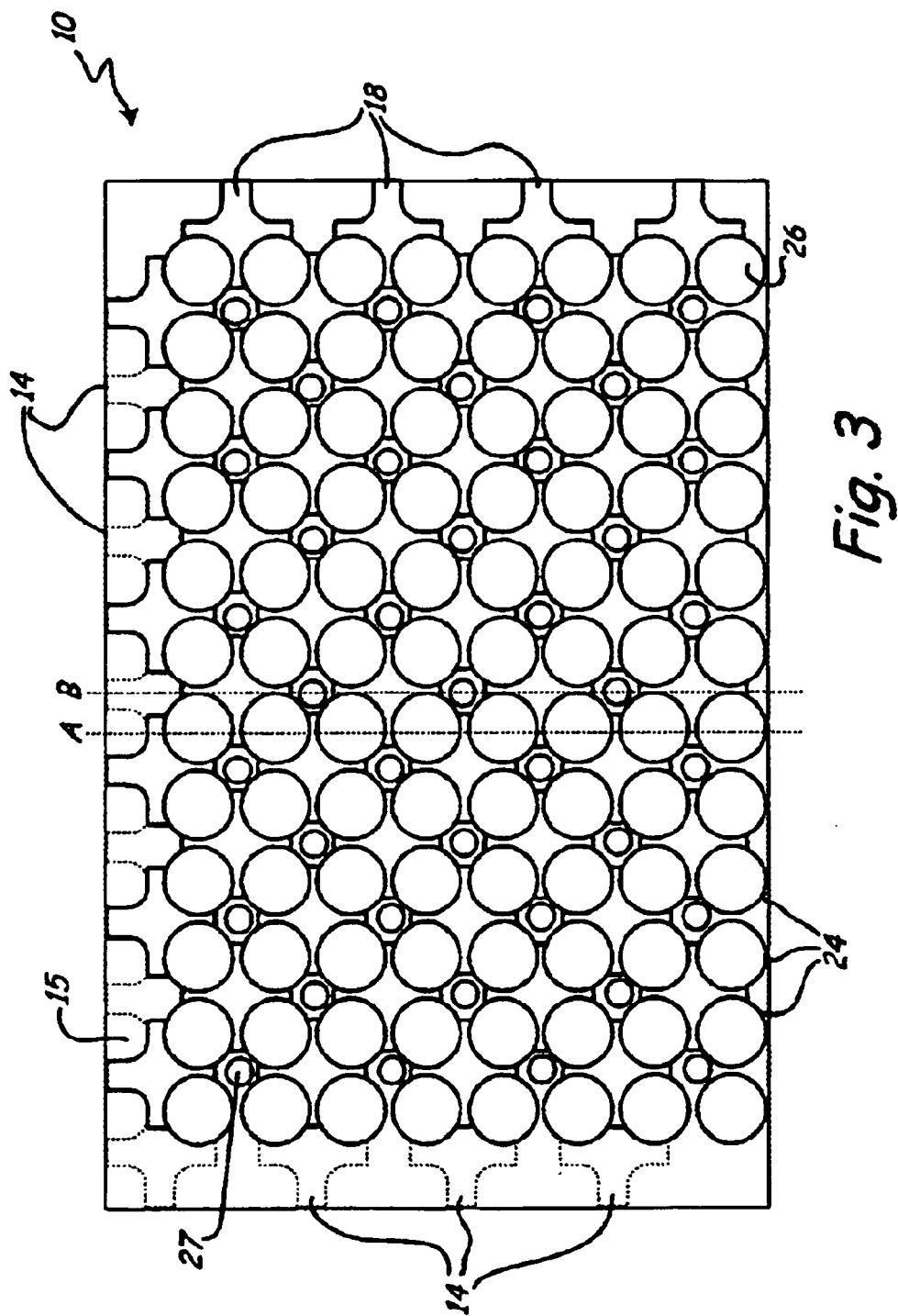
FIG. 3 is essentially the same as FIG. 1, except that the position of bonding spots for bonding the second guard plate layer to the third guard plate layer is shown.
Figure 4:
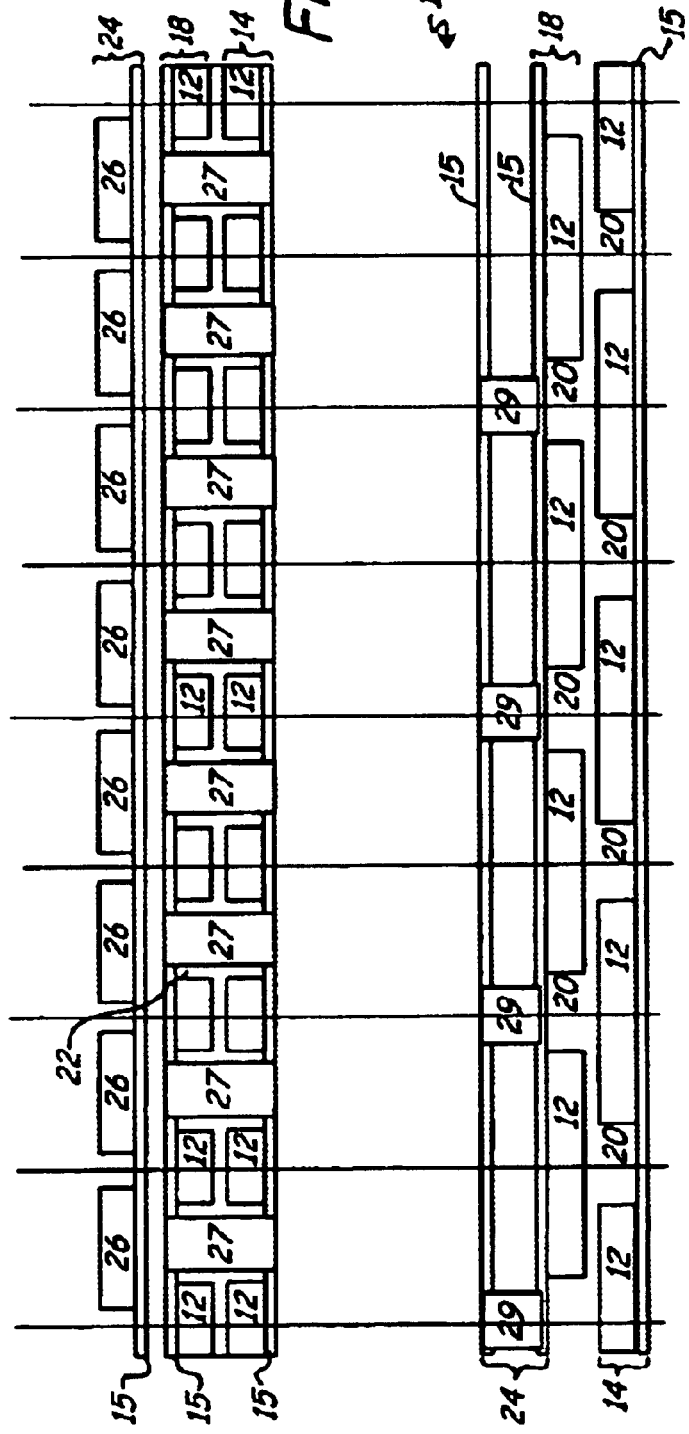
FIGS. 4A and 4B are cross-sectional views taken along the lines A and B, respectively, in FIGS. 1, 2, and 3 showing among other things the position of bonding spots for bonding the layers.

FIGS. 1 through 4 illustrate a three-layer fabric 10 embodiment, SF11, representing the inventive features of the present invention. As seen in FIGS. 1–3 identical cruciform-shaped guard plates 12 are spaced from each other and oriented in a first guard plate layer 14 with a connecting material 15. All four arms 16 of the cruciform plate 12 are the same. A second guard plate layer 18 is identical to layer 14, also with a connecting material 15. The two layers 14 and 18 are superimposed and oriented to each other to minimize registration of inter-plate spacing 20 between the first and second layers 14 and 18. As seen in FIG. 2, in this orientation, the inter-plate spacing 20 forms a non-interconnecting network of generally square-shaped apertures 22 with rounded corners. FIGS. 4A and 4B are cross-sectional views of the SF11 fabric of FIG. 1–3, taken along the lines A and B in FIGS. 1 and 3, respectively, showing the first and second guard plate 12 layers 14 and 18 and the position of bonding spots 27 for bonding the layers 14 and 18 to each other, and the third layer 24 of aperture plates 26 with the position of bonding spots 29 for bonding layer 24 to layer 18. The vertical spacing between layers 14 and 18 shown in FIG. 4A differs from that shown in FIG. 4B for illustration purposes only. Note that the bonding spots 27 and 29, respectively, are positioned so that they are not directly in a vertical line with each other. This enhances flexibility of the fabric. Furthermore, the bonding spots are at locations where the exposed connecting material of the bonded layers overlap. Bonding is done at these locations rather than between two rigid plates also to maintain flexibility.

FIG. 1 illustrates the superimposed guard plate layers 14, 18, overlaid with a layer 24 of circular aperture plates 26 with a connecting material 15. FIGS. 4A and 4B are a better illustration of the placement of connecting material 15. The layer 24 is positioned atop the superimposed layers 14 and 18 so that the aperture plates 26 overlay and cover the inter-plate spacing 20 between the first and second layers 14, 18. FIGS. 2 and 4B illustrate the positioning of bonding spots 29 for attaching the layer 24 of aperture plates 26 to the guard plate 12 layer 18. As seen in FIGS. 1 and 3, the guard plates 12 of layers 14 and 18 and the aperture plates 26 of layer 24 together cover the entire fabric 10. FIG. 3 is essentially the same as FIG. 1, except that the position of bonding spots 27 for bonding the first guard plate layer to the second guard plate layer is shown.

The SF11 fabric can be manufactured by attaching a chiffon fabric to a metal frame. A stencil with a pattern in the form of an array of plates (such as hexagons) is then placed over the chiffon. The chiffon is backed with a release film and printed with a polymer resin (such as can be formulated by Fielco or Devcon as described in more detail in this specification) through the stencil to form guard plates or aperture plates on the chiffon. The resin usually penetrates through the chiffon to mechanically lock the plates into the chiffon. The printed resin is then cured (by heat, room temperature, moisture, or ultra violet light as may be required by the resin's specification) and the release film is removed to form a plate layer. Multiple layers of plates may be stacked together, depending upon the design parameters required by the application for which the fabric is to be used. To achieve proper registration of the layers to each other so as to minimize the inter-plate spacing (that is to minimize the number and size of holes extending through the entire stack of layers), the metal frames contain registration holes for properly offsetting layers. This method of manufacture is applicable, with certain variations or additional steps that would be readily apparent to one skilled in the art, for manufacture of other fabric embodiments described in this specification. An example of an alternate for manufacturing a plate layer uses a photo-mask process for forming the plates rather than the stenciling method. In this method a sheet of connecting material is attached to a metal registration frame and the connecting material is then attached on top of a release film. The ultra violet curable resin is then is poured on the frame side of the connecting material. Another release film is placed on top of the resin and the resin is spread to form a thin film with the connecting material embedded in it. The film thickness is typically in the 5–10 mil range and can be controlled by the application of pressure on a blade used to spread the resin. A photo mask is then placed on top of the release and the whole assembly is secured together using clips. The resin not blocked by the mask is then cured under an ultra violet lamp. The uncured part of the resin is then washed away using an organic solvent, such as alcohol. After drying, a plate layer is obtained. The photo mask process has the advantage of better resolution control of the gap size between parts, as compared to conventional screen-printing. Using the same photo mask process, the ultra violet curable resin may be pre-mixed with glass fibers. After the washing process, some glass fibers may remain in the gap between the plates. An additional etching step is used to etch away these glass fibers. The plates reinforced with glass are strengthened and more puncture and cut resistant.

Figure 5:
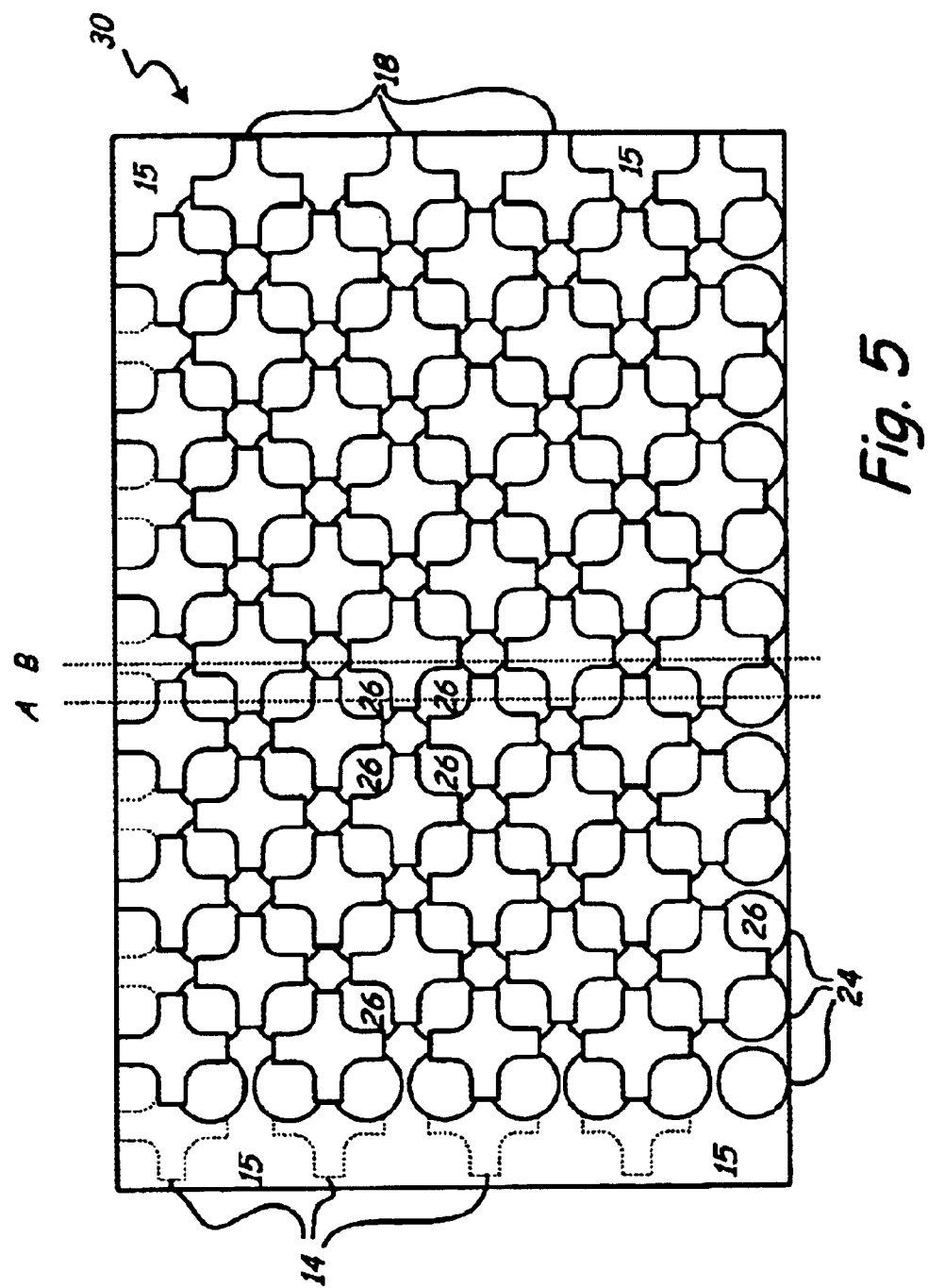
FIG. 5 is a plan view of another embodiment of the inventive fabric having first and lowest guard plate layer, second intervening layer of aperture plates, and third layer of guard plates each being staggered and superimposed upon one another, together covering the entire fabric area.
Figure 6:
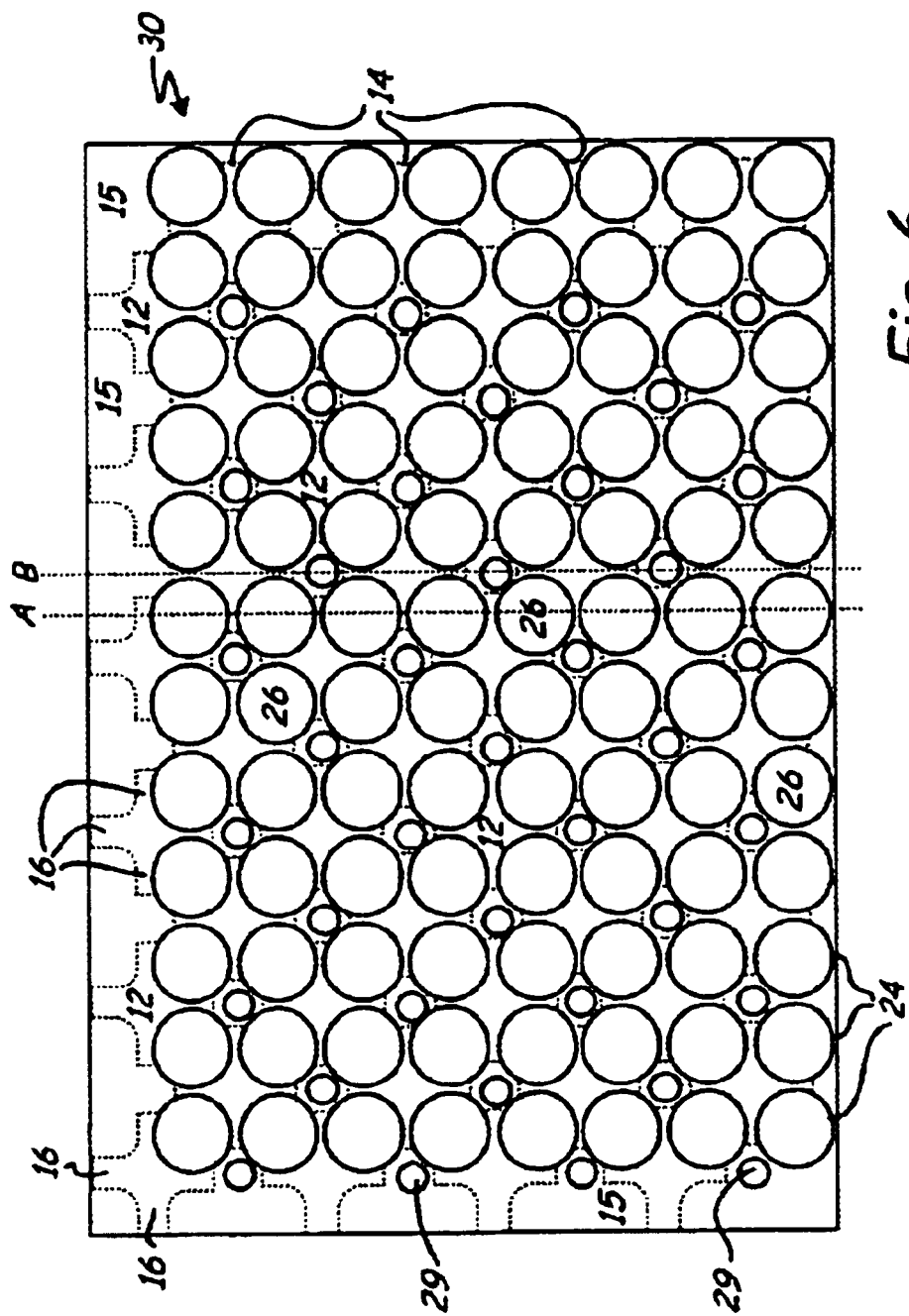
FIG. 6 is a plan view of the fabric of FIG. 5 showing the first guard plate layer, the aperture plate layer, and the position of bonding spots for bonding the aperture layer to the second guard plate layer.
Figure 7:
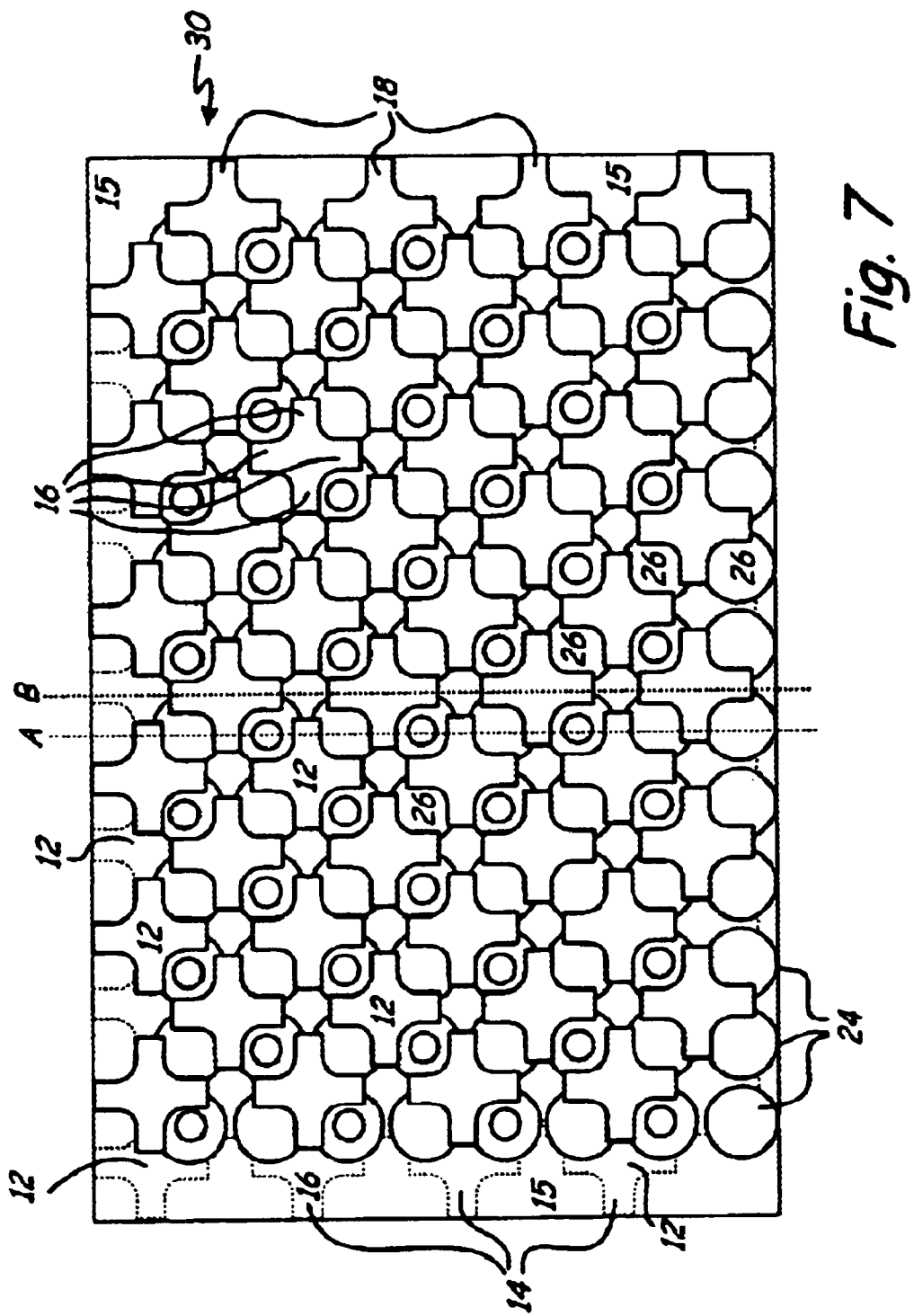
FIG. 7 is a plan view of the fabric of FIG. 5 showing the three layers and the position of bonding spots for bonding the second and third layers.
Figure 8:
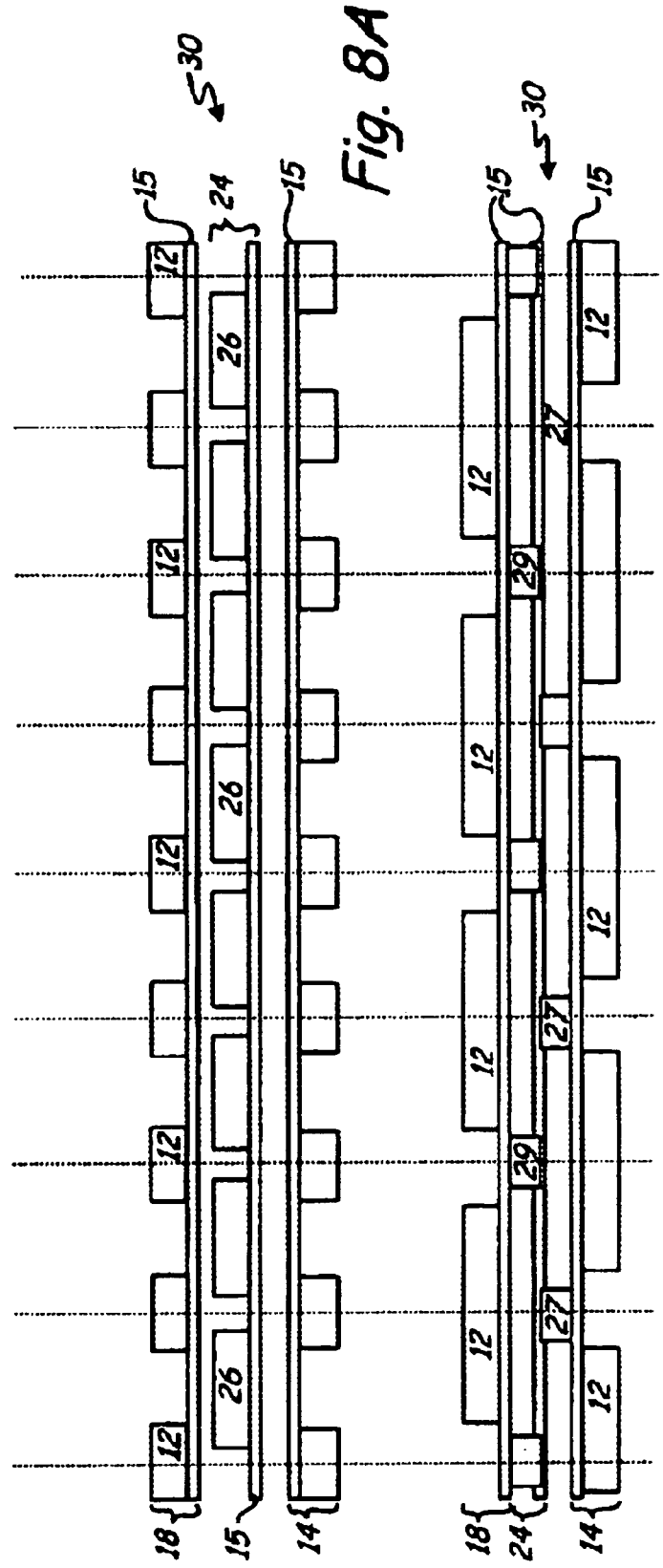
FIGS. 8A and 8B are cross-sectional views taken along the lines A and B, respectively, in FIGS. 5, 6, and 7 showing the position of bonding spots for bonding the layers.

FIGS. 5–8 illustrate a fabric embodiment 30, also identified as SF 12, of the present invention. The SF12 fabric is comprised of the same layers as in the SF1 1 fabric 10, but the layers are superimposed upon one another in a different arrangement. As seen in FIG. 5, identical cruciform-shaped guard plates 12 are spaced from each other and oriented in a first guard plate layer 14 with a connecting material 15 to maintain the array of guard plates 12. All four arms 16 of the cruciform guard plate 12 are the same. A second guard plate layer 18 is identical to layer 14, also with a connecting material 15 to maintain the guard plate 12 array. The two layers 14 and 18 are superimposed and oriented to each other to minimize registration of inter-plate spacing 20 between the first layer 14 and the third or top layer 18. Interposed between layers 14 and 18 is a second layer 24 of circular aperture plates 26 with a connecting material 15 to maintain the aperture plate 26 array. As seen in FIG. 5 and 7, the guard plate arrays 12 of layers 14 and 18 and the aperture plates 26 of layer 24 together cover the entire fabric 30.

FIGS. 8A and 8B are cross-sectional views of the SF12 fabric of FIGS. 5–7, showing the first and second guard plate layers 14 and 18 and the aperture plate 26 layer 24, with each layer having a connecting material to maintain the guard plate layers 18 and 14 and the aperture plate layer 24. Seen in FIG. 8B, are the bonding spots 27 for bonding layers 14 and 24 to each other, and the bonding spots 29 for bonding layers 24 and 18 to each other. FIG. 6 also shows the location and patterning of bonding spots 29.

FIGS. 1 through 8, particularly the cross-sectional views of FIGS. 4A, 4B, 8A and 8B show the connecting material 15 onto which each of the layers 14, 18, and 24 of plates 12 and 26 are arrayed. The connecting material 15 maintains the pattern and inter-plate spacing of the plates 12 and 26 of the various layers 14, 18, and 24. The structure and function of the connecting material 15 in relation to the formation of the array of each layer 14, 18, and 24 will be further explained regarding the method of manufacture.

FIGS. 9 and 10 illustrate a fabric 40 embodiment, identified as SF15, embodying novel features of the present invention. As seen in FIG. 9, identical equilateral hexagonal-shaped guard plates 42 are spaced from each other and oriented in a first guard plate layer 44 with a connecting material 15. A second layer 46 is also an array of identical equilateral hexagonal-shaped guard plates and is also affixed to connecting material 15. The connecting material 15 maintains the pattern and inter-plate spacings of the plates 42 of each of the layers 44 and 46. The two layers 44 and 46 are superimposed and oriented to each other to minimize registration of inter-plate spacing 48 between the first and third layers 44 and 46. As seen in FIG. 9, in this orientation, the inter-plate spacing 48 form a non-interconnecting network of six-pointed star-shaped apertures 50. Interposed between the layers 44 and 46 is a layer of base material 47, with a connecting material 15 overlaying both surfaces 49 of the base material 47. FIGS. 10A and 10B are cross-sectional views of FIG. 9, taken along the lines A and B, respectively. As seen in FIG. 9, the guard plates 42 of layers 44 and 46 do not cover the entire fabric 10, but leave uncovered the non-interconnecting network of six-pointed star-shaped apertures 50. The apertures 50 must be sufficiently small to insure optimum guard plate coverage and the layers must be registered to minimize the aperture 50 size.

Manufacture of the SF15 fabric and other embodiments of fabric of this invention having a base material are made using the process as described in connection with the SF11 fabric, except that the base material is first attached to the metal frame and the connecting material is laid on top of the base material. The resin for the plates is stenciled onto the composite of the connecting material and the base material. The resin penetrates the connecting material and attaches to the base material upon curing. The same process can be repeated on the opposite side of the base material to make another opposing plate layer.

Figure 11:
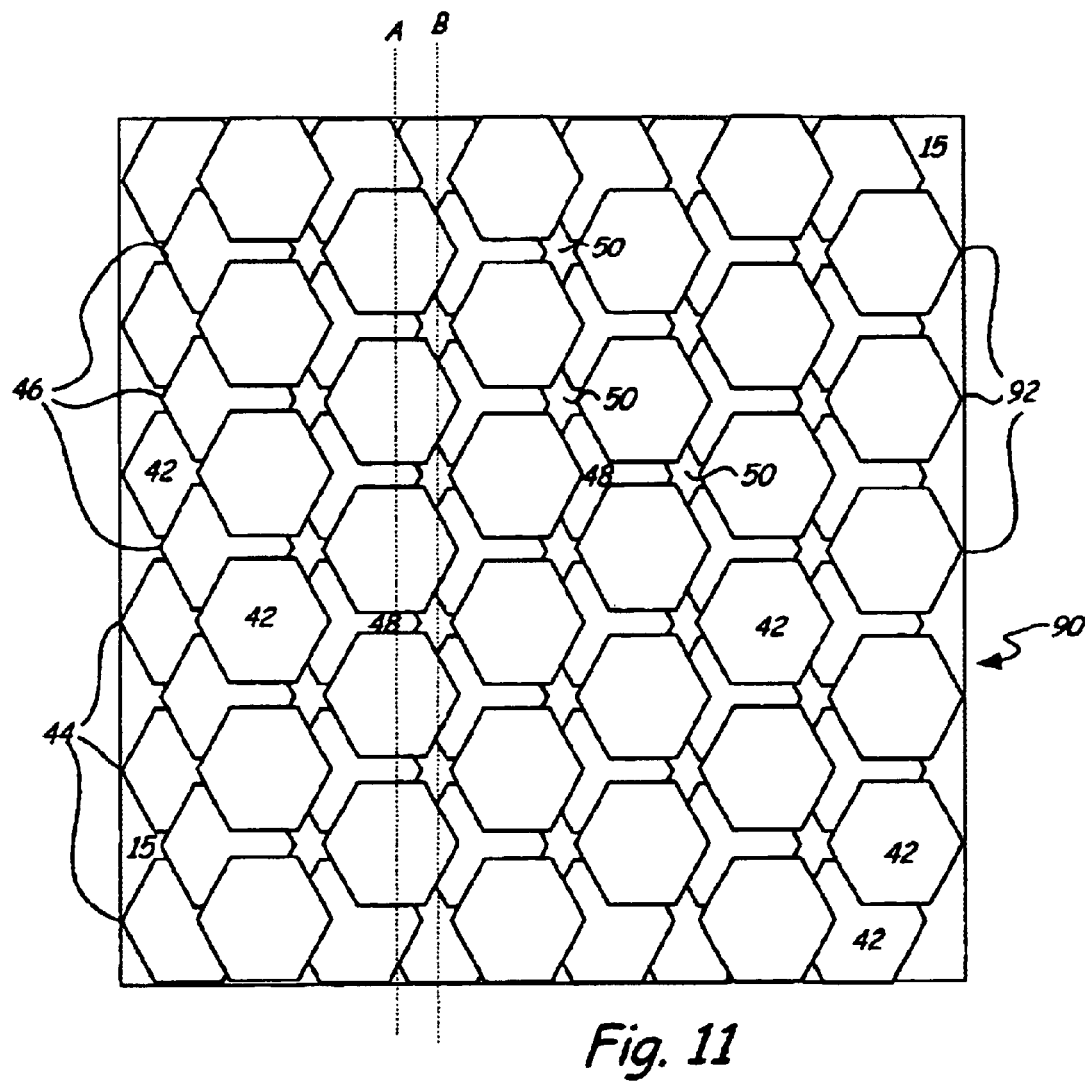
FIG. 11 is a plan view of a further embodiment of the fabric having three identical superimposed guard plate layers.

FIGS. 11 and 12 are plan and cross-sectional views, respectively, of another embodiment of the inventive fabric 90, SF16, having three identical superimposed guard plate 42 layers 44, 46, and 92, which are also spot bonded together. As seen in FIG. 11, identical equilateral hexagonal-shaped guard plates 42 are spaced from each other and oriented in a first guard plate layer 44 with a connecting material 15. A second guard plate layer 46 is identical to layer 44, also with a connecting material 15. A third guard plate layer 92 is identical to layers 44 and 46, also with a connecting material 15. The connecting material 15 maintains the pattern and inter-plate spacing of the plates 42 of each of the layers 44, 46, and 92. The two layers 44 and 46 are superimposed and oriented to each other to minimize registration of inter-plate spacing 48 between the first and second layers 44 and 46. As seen in FIG. 11, in this orientation, the inter-plate spacing 48 form a non-interconnecting network of six-pointed star-shaped apertures 50. The guard plates 42 of the third layer 92, together with the guard plates 42 of layers 44 and 46 provide complete coverage of fabric 90. FIGS. 12A and 12B are cross-sectional views of fabric 90 of FIG. 11, showing the three layers 44, 46, and 92 of guard plates and the three connecting materials 15. FIGS. 11 and 12 do not show the position of bonding spots in the SF16 fabric. The bonding positions are not commensurate with the guard plate array. That is, the pattern of bonding spots does not correspond to the patterns of the guard plate arrays. The fabric layers are bonded together to minimize vertical alignment of bonding spots in successive layers of the stack of layers. The incidental occurrence of some bonding spots vertically above each other in the different layers tends to somewhat reduce the fabric flexibility. However, using less overall bonding compensates for this incidental occurrence of vertical alignment of bonding spots throughout multiple layers.

Figure 13:
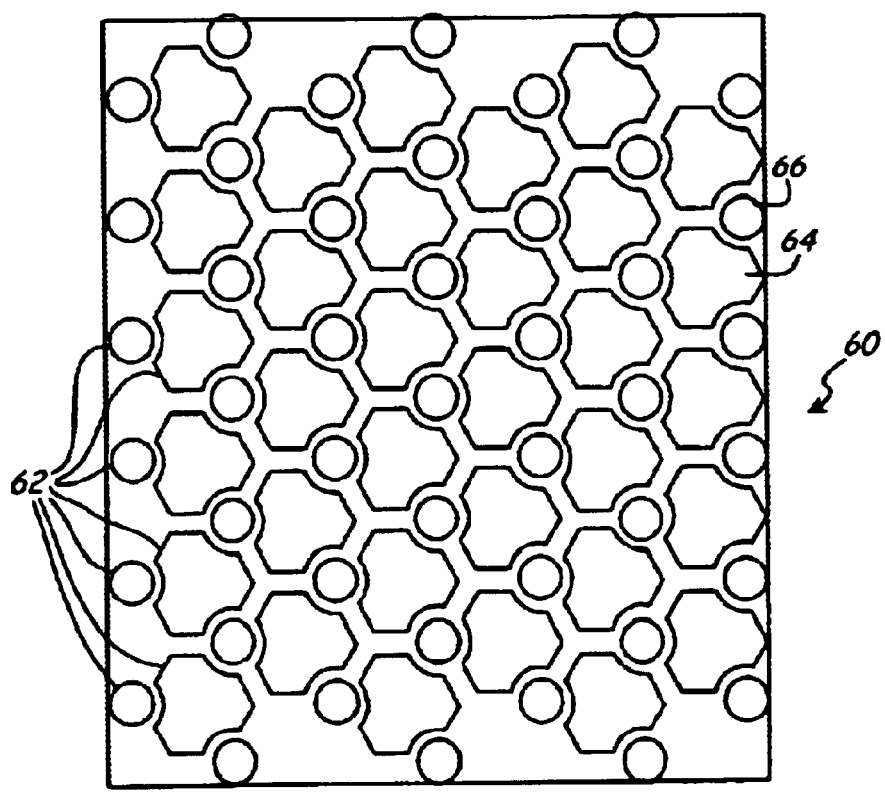
FIG. 13 is a plan view of another embodiment of the fabric showing the first layer having a pattern of non-identical guard plates.
Figure 14:
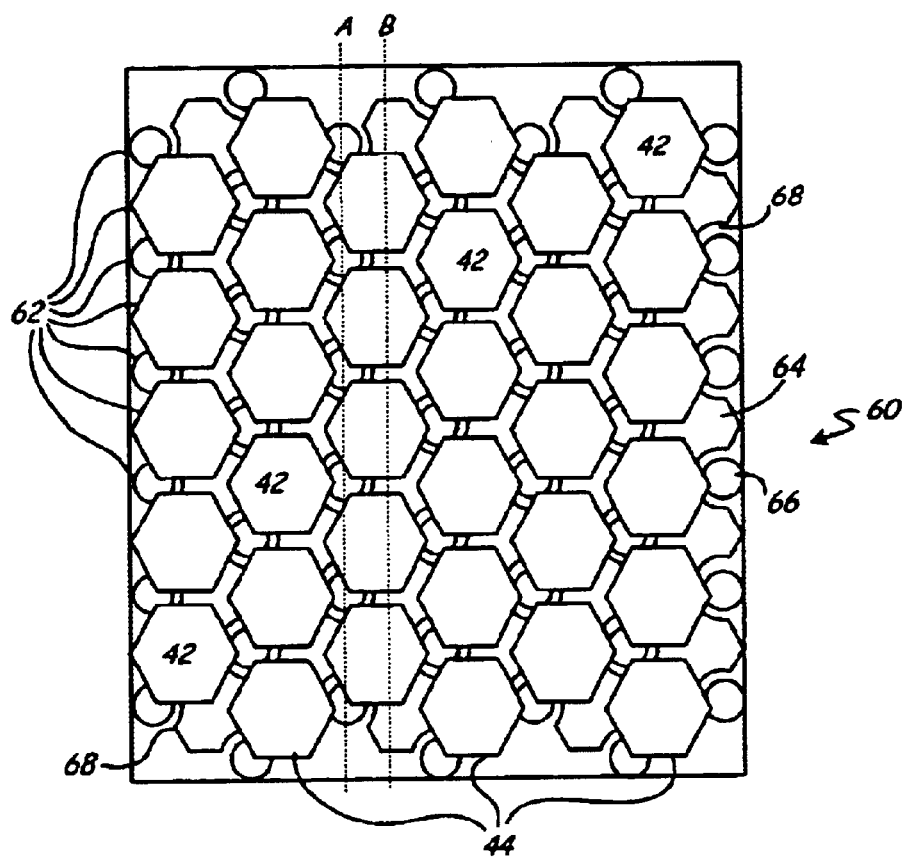
FIG. 14 is a plan view of the fabric of FIG. 13 showing the second layer superimposed on the first layer.

FIGS. 13–15 illustrate a fabric 60 embodiment, identified as SF17, embodying novel features of this invention. As illustrated in FIG. 13, the first layer 62 of the fabric is a pattern of guard plates 64 that are equilateral hexagon shapes, with three alternate concave-curved corners. Three adjacent guard plates 64 together form a circular-shaped aperture to provide for a circular-shaped guard plate 66. Note that the overall pattern has an equal number of each guard plates 64 and 66 spaced from each other and oriented in a first guard plate layer 62 with a connecting material 15.

Figure 15A:
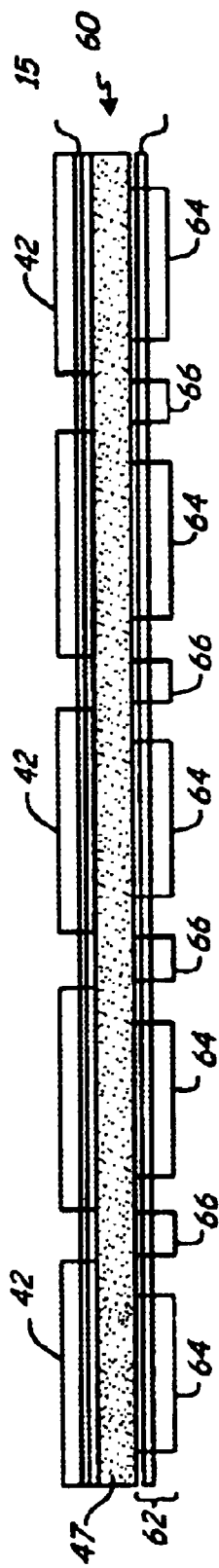
FIGS. 15A and 15B are cross-sectional views of the fabric of FIG. 14 taken along the lines A and B, respectively, showing the layers interposed by a base material.
Figure 15B:
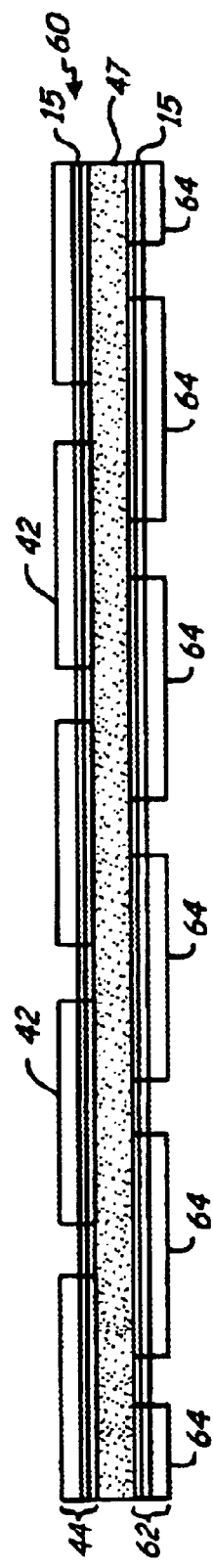

FIG. 14 illustrates the second layer 44, identical to the guard plate layer 44, shown in FIG. 9, superimposed on the layer 62. Layer 44 has identical equilateral hexagonal-shaped guard plates 42 spaced from each other and oriented in a guard plate layer 44 with a connecting material 15, as seen in the cross-sectional views of FIGS. 15A and 15B. The two layers 44 and 62 are superimposed and the guard plates 42, 64, and 66 are oriented to each other to minimize registration of inter-plate spacing 68 between the first and second layers 44 and 62. In the orientation shown in FIG. 14, the inter-plate spacing 68 form a non-interconnecting network of circularly curved arms. FIGS. 15A and 15B are cross-sectional views of the SF17 fabric 60 of FIG. 14, taken along lines A and B, respectively. Interposed between the layers 44 and 46 is a base material 47, with a connecting material 15 overlaying both surfaces of the base material 47, as seen in FIGS. 15A and 15B. As seen in FIG. 14, the guard plates 42, 64, and 66 of layers 44 and 62 do not cover the entire fabric 60, because of the non-interconnecting network of curved arm inter-plate spacing 68. It has been determined that it is easier to control the position and minimize the size of apertures in the SF17 style fabric than in the SF15 style fabric. Therefore, the threshold of puncture resistance for SF17 is greater than for SF15.

FIGS. 16 and 17 illustrate a fabric 120 embodiment, identified as SF18, embodying novel features of the invention. As seen in FIG. 16, a layer 122 of an array of equilateral hexagons 124 interposed with an equal number of squares 126 constitute the guard plates 124 and 126. The guard plates 124 and 126 are spaced from each other and oriented in a second guard plate layer 122 with a connecting material 15. A first guard plate layer 128 is identical to layer 122, also with a connecting material 15. The connecting material 15 maintains the pattern and inter-plate spacing of the plates 124 and 126 of each of the layers 122 and 128. The two layers 122 and 128 superimpose and orient to each other to minimize registration of inter-plate spacing 130 between the first and second layers 128 and 122. As seen in FIG. 16, the guard plates 124 and 126 of layers 122 and 128 do not cover the entire fabric 120. The inter-plate spacing 130 form a non-interconnecting network of square apertures 131. The apertures 131 must be sufficiently small to ensure optimum guard plate coverage of the fabric. Interposed between the layers 122 and 128 is a base material 47, with a connecting material 15 overlaying both surfaces of the base material 47. FIGS. 17A and 17B are cross-sectional views of FIG. 16, taken along the lines A and B, respectively.

Figure 18:
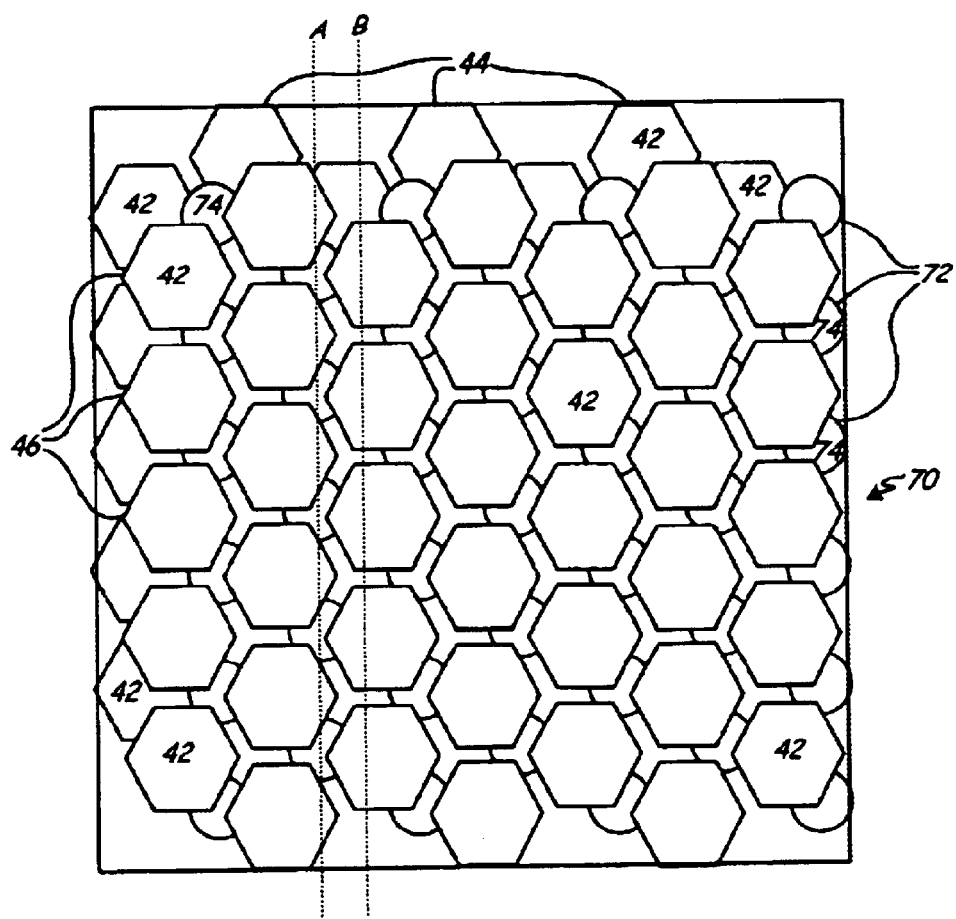
FIG. 18 is a plan view of an additional embodiment of the fabric having first and second superimposed staggered layers of guard plates and a third intervening layer of aperture plates.
Figure 19A:
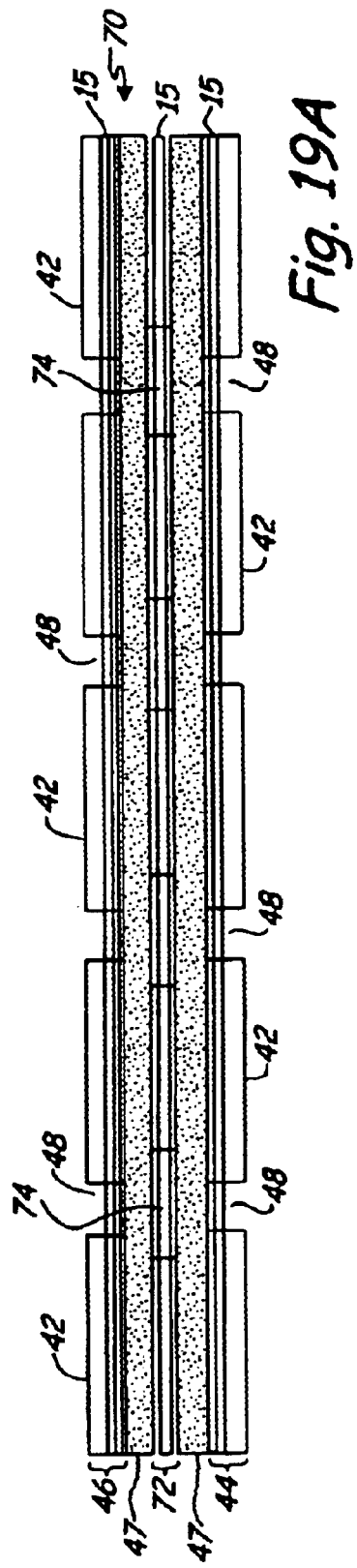
FIGS. 19A and 19B are cross-sectional views of the fabric of FIG. 18 taken along the lines A and B, respectively, showing the aperture layer positioned between two sheets of base material.
Figure 19B:
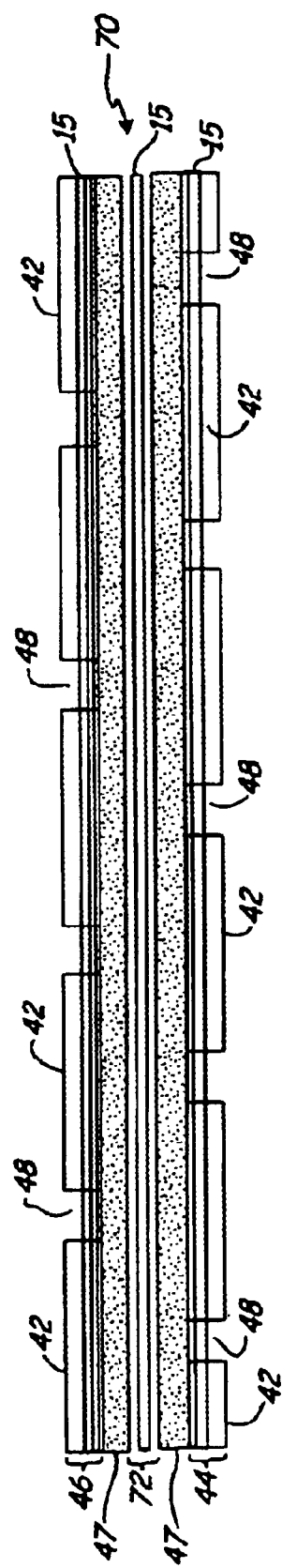

FIGS. 18 and 19 are plan and cross-sectional views, respectively, of another embodiment of the inventive fabric 70, SF22, having first and third superimposed, staggered layers 44 and 46 of guard plates 42 and a second intervening layer 72 of aperture plates 74. As seen in FIG. 18, identical equilateral hexagonal-shaped guard plates 42 are spaced from each other and oriented in a first guard plate layer 44 with an interconnection of a connection material 15. A third layer is guard plate layer 46, which is identical to layer 44, also with a connecting material 15. The two guard plate 42 layers 44 are identical to those shown in FIG. 9 above. The connecting material 15 maintains the pattern and inter-plate spacing of the plates 42 of each of the layers 44 and 46. The two layers 44 and 46 are superimposed and oriented to each other to minimize registration of inter-plate spacing 48 between the first and third layers 44 and 46. As seen in FIG. 9, in this orientation, the inter-plate spacing 48 form a non-interconnecting network of six-pointed star-shaped apertures 50. FIGS. 19A and 19B are cross-sectional views of the SF22 fabric of FIG. 18. Interposed between the layers 44 and 46, as seen in FIGS. 19A and 19B, are two sheets of base material 47, with a single connecting material 15. The connecting material 15 interconnects a second layer 72 of circular aperture plates 74, each of which overlies an aperture 50. As seen in FIG. 18, the guard plates 42 of layers 44 and 46 and the aperture plates 74 of layer 72 together cover the entire fabric 70.

Alternatively, a fabric of this inventive embodiment may be assembled without the connecting material for the second layer 72 of circular aperture plates 74. The second layer 72 may omit the connecting material 15, because the aperture plates 74 are not subject to debonding stresses, as they would be if they were surface plates. With or without the connecting material, the second layer 72 of circular aperture plates 74 are established on a first sheet of base material. The second sheet of base material is then pressed onto the layer 72 and the entire assembly is cured to the degree necessary.

Figure 20:
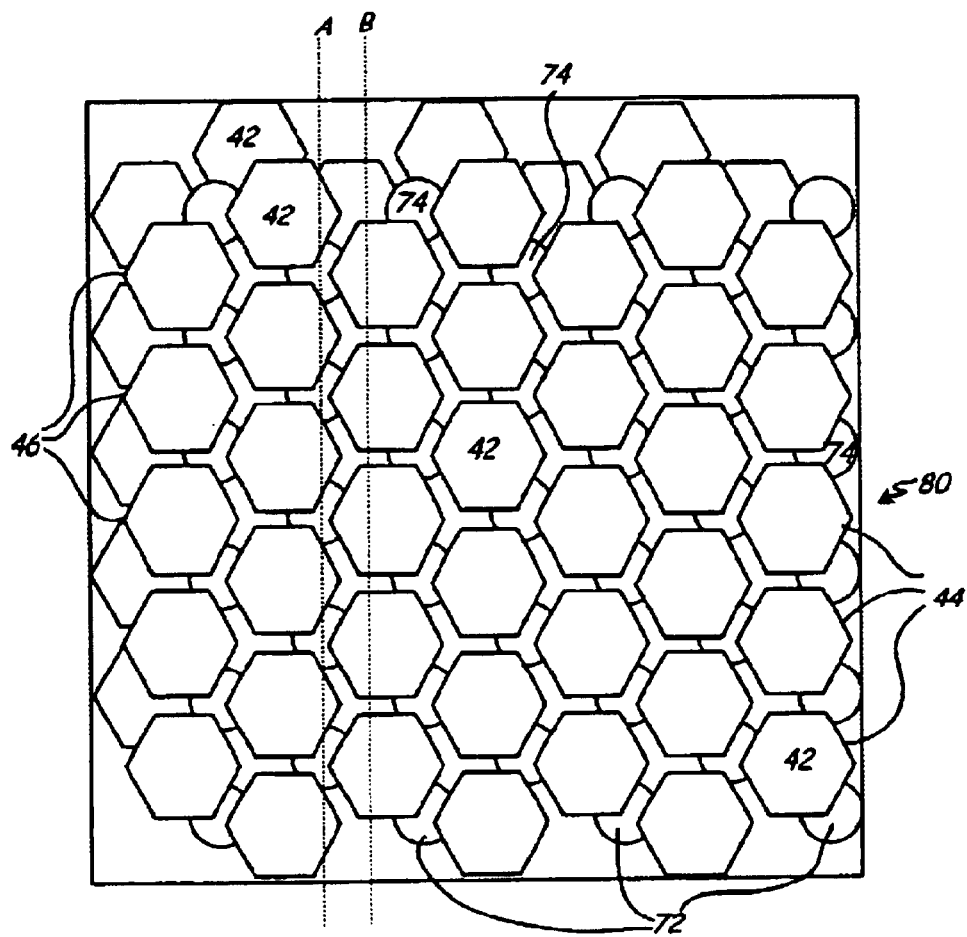
FIG. 20 is a plan view of an embodiment of the fabric having first and second superimposed staggered layers of guard plates and a third intervening layer of aperture plates.

FIGS. 20–21 are plan and cross-sectional views, respectively, of a further embodiment of the inventive fabric 80, also designated as SF24, having first and third superimposed, staggered layers 44 and 46 of guard plates 42 and a second intervening layer 72 of aperture plates 74. As seen in FIG. 20, identical equilateral hexagonal-shaped guard plates 42 are spaced from each other and oriented in a first guard plate layer 44 with a connecting material 15. The third layer 46, composed of guard plates 42 is identical to layer 44, also with a connecting material 15. The connecting material 15 maintains the pattern and inter-plate spacing of the plates 42 of each of the layers 44 and 46. The two layers 44 and 46 are superimposed and oriented to each other to minimize registration of inter-plate spacing 48 between layers 44 and 46. As seen in FIG. 9, in this orientation, the inter-plate spacing 48 form a non-interconnecting network of six-pointed star-shaped apertures 50. The first layer and the second layers 44 and 46, both composed of identical guard plates 42 and the second intervening layer 72 of aperture plates 74 are oriented and spaced identically to those shown in FIG. 14. FIGS. 21A and 21B are cross-sectional views of the SF24 fabric of FIG. 20. Interposed between the layers 44 and 46 is a base material 47. FIG. 21A shows the layer 72 of aperture plates 74 embedded into one surface of the base material 47. The plates 74 are arranged in an array on the base material and then pressed into the base material. Pressing of the plates 74 into the base material may take place when the plates are uncured, or partly or fully cured. If the plates 74 have not been fully cured before being pressed into the base material, the entire assembly is then cured as required. This embodiment of the fabric with plates embedded into the base material is of reduced flexibility. This technique of embedding plates into base material would not be used for surface plates, particularly where optimum flexibility is required.

A connecting material 15 overlies the surfaces of the base material 47, as seen in FIGS. 21A and 21B. The guard plates 42 are applied to the base material 47 through the connecting material 15. As seen in FIG. 20, the guard plates 42 of layers 44 and 46 and the aperture plates 74 of layer 72 together cover the entire fabric 70.

Figure 22:
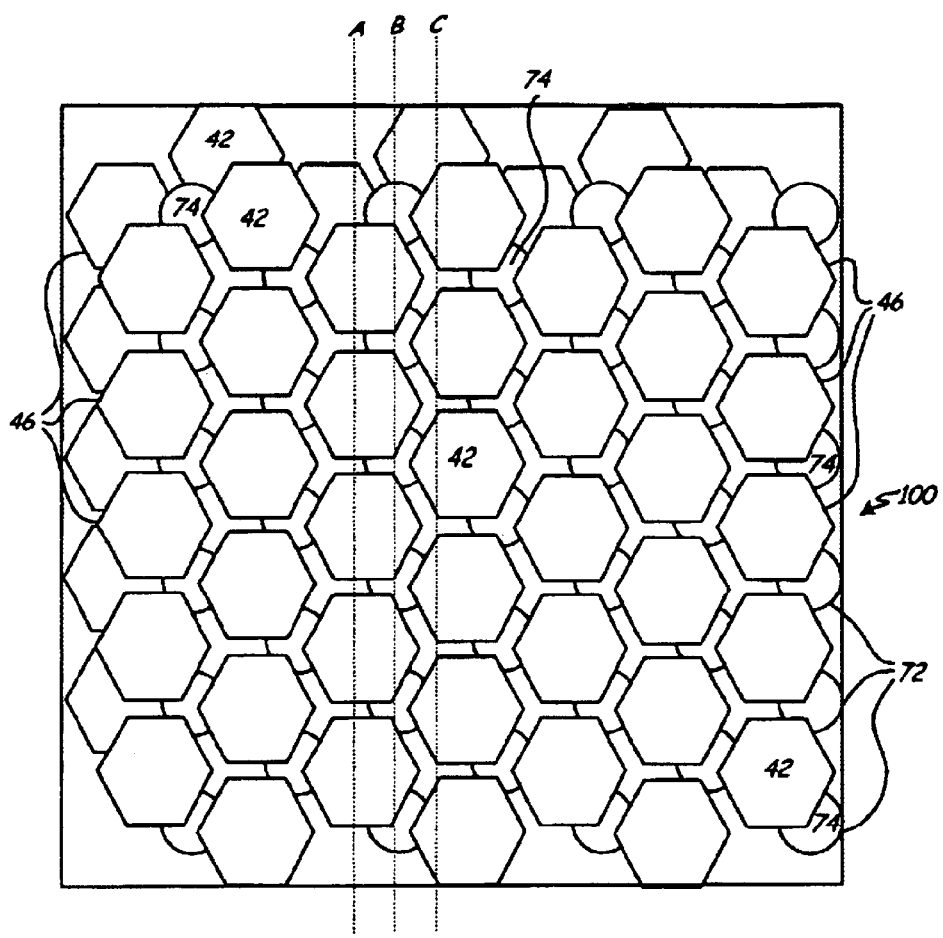
FIG. 22 is a plan view of another embodiment of the fabric having first and lowest and third and top superimposed, staggered layers of guard plates and a second intervening layer of aperture plates, together covering to the entire fabric surface.
Figure 23:
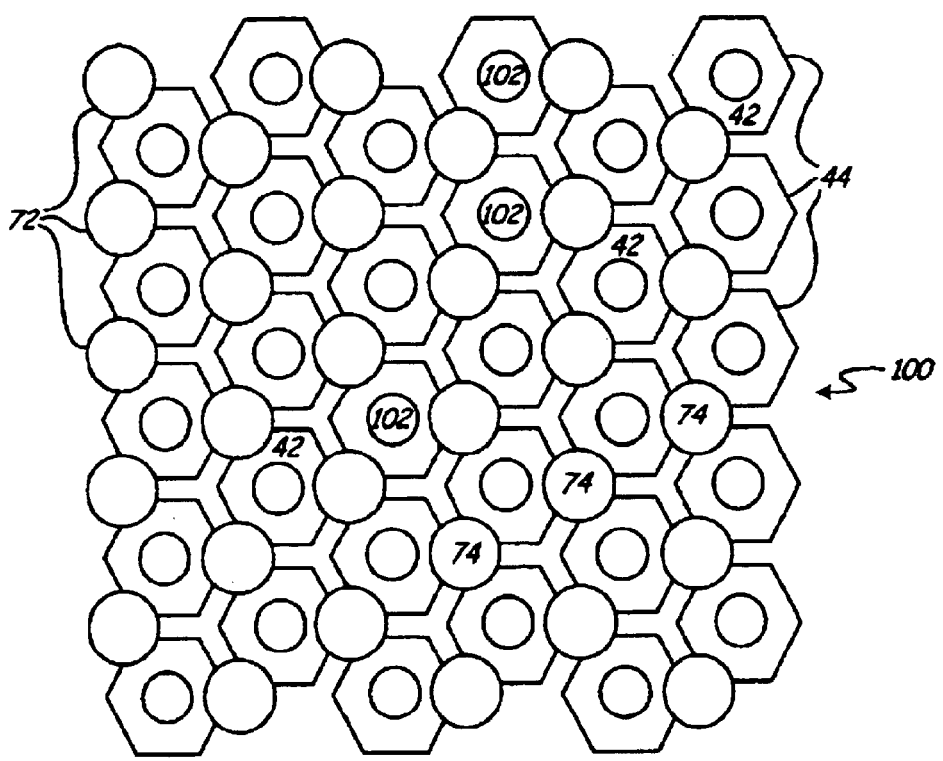
FIG. 23 is a plan view of the fabric of FIG. 22 showing the first guard plate layer and the aperture plate layer and the position of bonding spots for bonding the second guard plate layer.

FIGS. 22 and 23 are plan views and FIGS. 24A, 24B and 24C are cross-sectional views, respectively, of an embodiment of the inventive fabric 100, SF25, taken along the lines A, B and C, respectively, of FIG. 22. Fabric SF25 has first and third superimposed, staggered layers 44 and 46 of guard plates 42 and a second intervening layer 72 of circular aperture plates 74. As seen in FIG. 22, identical equilateral hexagonal-shaped guard plates 42 are spaced from each other and oriented in a first guard plate layer 44 with a connecting material 15. A third layer 46 composed of guard plates 42 is identical to layer 44, also with a connecting material 15. The two guard plate 42 layers 44 and 46 are identical to those shown in FIGS. 9, 11, 17, and 20. The aperture plate 74 layer 72 is identical to those shown in FIGS. 18 and 20. The connecting material 15 maintains the pattern and inter-plate spacing of the guard plates 42 of each of the layers 44 and 46 and of the aperture plates 74 of the layer 72. The two layers 44 and 46 are superimposed and oriented to each other to minimize registration of inter-plate spacing 48 between the first and second layers 44 and 46. As seen in FIG. 9, in this orientation, the inter-plate spacing 48 form a non-interconnecting network of six-pointed star-shaped apertures 50. As illustrated in FIGS. 22 and 24, the size and positioning of guard plates 42 of layers 44 and 46 and the aperture plates 74 of layer 72 completely cover all of the apertures 50, so that the fabric SF25 is completely covered by the combination of plates 42 and 74. FIG. 23 is a view of the layer 72 of aperture plates 74 superimposed on the layer 44 of guard plates 42, and showing the position of bonding spots 102 for bonding the guard plate layer 44 to layer 72. With reference to FIGS. 24A, 24B and 24C, note that the guard plates 42 of layer 44 and the guard plates 42 of layer 46 are both oriented to the exterior of fabric SF25. Interposed between the layers 44 and 72 are bonding spots 102 and interposed between layers 72 and 46 are bonding spots 104. Between the layers 44 and 46 is the third layer 72 of circular aperture plates 74, each of which overlies an aperture 50.

Figure 25:
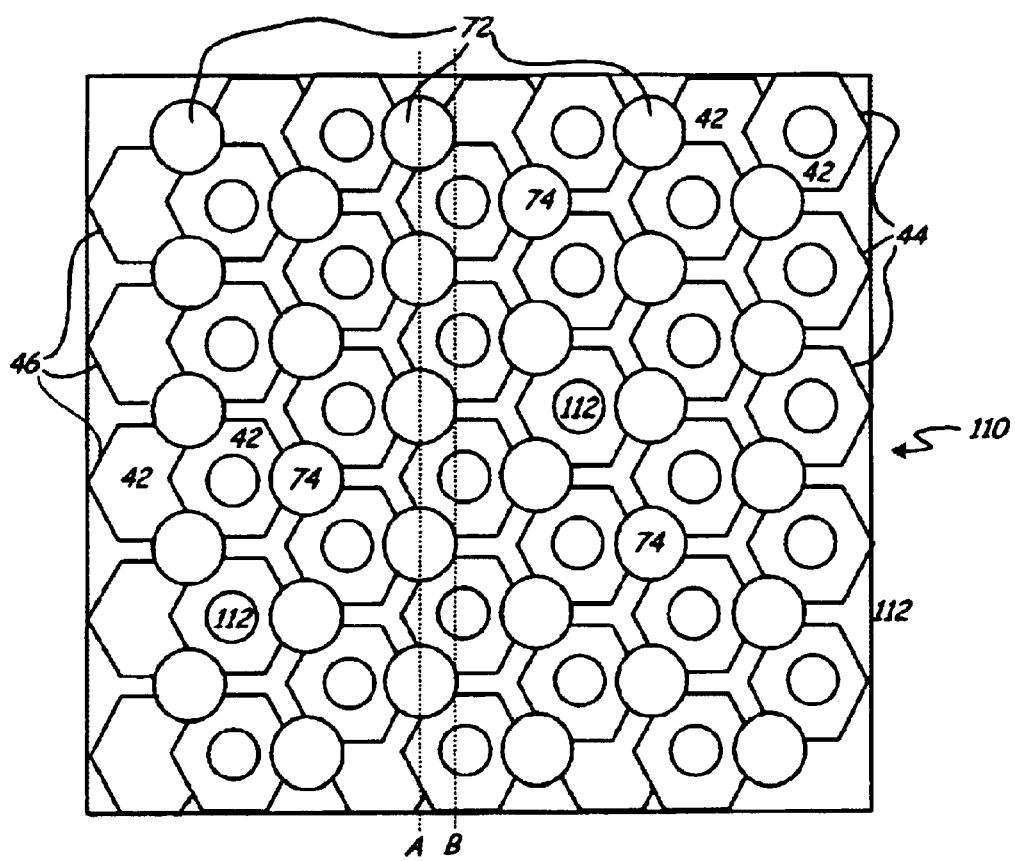
FIG. 25 is a plan view of another embodiment of the fabric having first and second superimposed, staggered layers of guard plates and a third and top aperture plate layer, which also shows the position of bonding spots.

FIGS. 25 and 26 are plan and cross-sectional views, respectively, of a further embodiment of the fabric 110 of this invention. This embodiment is also referred to in this disclosure as SF26. Third and second staggered layers 46 and 44 of equilateral hexagonal guard plates 42 superimpose each other, with a third superimposed layer 72 of circular aperture plates 74. As seen in FIG. 9, identical equilateral hexagonal-shaped guard plates 42 are spaced from each other and oriented in a second guard plate layer 44 with a connecting material 15. A third guard plate layer 46 is identical to layer 44, also with a connecting material 15. The two guard plate 42 layers 44 are identical to those shown in FIG. 9. The connecting material 15 maintains the pattern and inter-plate spacing of the plates 42 of each of the layers 44 and 46. The two layers 44 and 46 are superimposed and oriented to each other to minimize registration of inter-plate spacing 48 between the third and second layers 46 and 44.

Interposed between the layers 46 and 44 is a base material 47, as seen in the cross-sectional view of FIGS. 26A and 26B. As seen in FIG. 9, in this orientation, the inter-plate spacing 48 form a non-interconnecting network of six-pointed star-shaped apertures 50. The third layer 72 of circular aperture plates 74 overlies one of the layers 44 and 46, with the aperture plates oriented to the exterior of the SF26 fabric. FIG. 25 shows a plan view of the bonding spots 112. As seen in FIG. 25, the guard plates 42 of layers 46 and 44 and the aperture plates 74 of layer 72 together cover the entire fabric 70.

Figure 28:
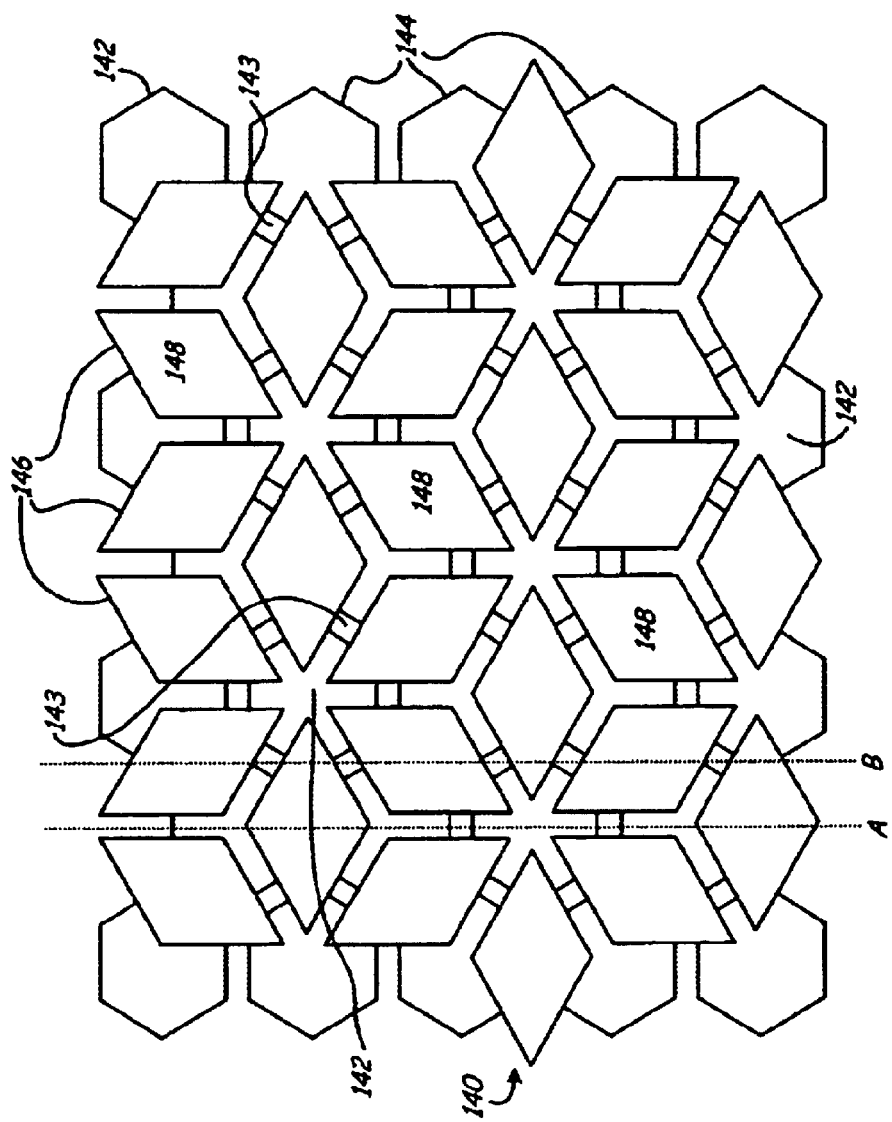
FIG. 28 is a plan view of another embodiment comprising a first layer of hexagons and a second layer of parallelograms.

FIG. 28 is a plan view of another embodiment of the fabric 140 of this invention comprising a first layer 144 of hexagons and a second layer 146 of parallelograms 148. FIGS. 29A and 29B are cross-sections of FIG. 28 taken along lines A and B of FIG. 28, respectively. As shown in FIGS. 29A and B, the fabric is also comprised of a base material 47 and connecting material 15 interconnecting the array of hexagons 142 of the first layer 144. The connecting material also interconnects the parallelograms 148 of the second layer 146. The fabric layers 144 and 146 are bonded to the base material 47 in any suitable manner to meet the design needs of the fabric application. The fabric has non-interconnected gaps 143 in the shape of squares.

FIG. 27A, B, and C describe a process of making a metal wire reinforced guard plate layer especially suitable for medical material. Puncture resistant material for medical gloves must be soft and flexible to maintain dexterity for medical personnel, yet provide a high level of puncture and cut resistance against sharp medical needles and knives. The softness and flexibility requirement dictates that the material must be fairly thin, preferably thinner than 1 mm. If multiple layers are used, the thickness of each plate layer must be reduced to less than 1 mm, which may not be sufficiently strong to resist the puncture and cutting forces encountered in the medical environment. In order to achieve the desired combination of thinness, flexibility, and strength, the polymeric plates must be reinforced or replaced with metal plates. The fabric illustrated in FIGS. 27A, B, and C utilizes metal wire mesh embedded in the polymer resin used to fabricate the plates. Wire mesh other than metal may also be efficacious, depending upon its type and characteristics. A typical metal wire mesh is less than 10 mils thick and made of steel. FIG. 27C illustrates a fabric 50 embodiment of this invention. FIGS. 27A and 27B illustrate intermediate steps in the manufacture process of the fabric 50.

The fabric of FIG. 27C is fabricated with metal wire mesh 52 embedded in the guard plate 54 before the polymeric resin of the guard plate 54 sets. The process includes covering a sheet of connecting material 15 with metal wire mesh 52 and then pouring polymeric resin 53 over the wire mesh-connecting material combination as shown in FIG. 27A. Next, a photo mask patterned in the form of an array of guard plates 54 is placed over the wire mesh 52-connecting material 15-resin 53 combination. The photo mask pattern has openings where the guard plate 54 locations are to be in the finished fabric 50. The photo masked material is then exposed to ultra violet light to cure the resin 53 that is not covered by the photo mask, which is the guard plate 54 array. The unexposed, uncured resin 53 in the gaps is then washed away yielding the intermediate fabric illustrated in FIG. 27B. The intermediate fabric now has gaps 55 between guard plates 54. The exposed metal mesh 52 between (in the gaps 55) the guard plates 54 is now etched away, using ferric chloride for example, to produce the fabric 50 of this invention as shown in FIG. 27C. The fabric 50 produced by this process has an array of guard plates 54 integrally reinforced with metal wire mesh 52. And the guard plates 54 are inter-connected by connecting material 15, which extends between the gaps 55 and through and integral with the guard plates 54.

FIGS. 30A and B are cross-sectional views of another embodiment of this invention comprising a metal guard plate layer 151. The metal guard plate 152 may be, for example, fabricated using 2 to 5-mil thick stainless steel sheet. A metal sheet 155 is bonded to connecting material 15, such as a flexible substrate chiffon, by completely covering the connecting material 15 with a flexible bonding agent 153, such as a polyurethane as shown in FIG. 30A. The method of complete coverage results in saturation of the connecting material 15 so that the bonding agent 153 covers both sides of the connecting material 15. Photo resist films are applied to both sides of the composite shown in FIG. 30A in a guard plate array pattern and the metal sheet 155 is then etched to leave an array of guard plates 152 that are disconnected from one another as shown in FIG. 30B. The photo resist material is removed after the etching step. The guard plate array is held in the pre-defined spatial relationship by the connecting material 15, which is bonded to the guard plates by the flexible bonding agent 153. To further enhance the strength of the fabric 150, a double layer of guard plates 152 can be made by bonding a metal sheet 155 to both sides of the connecting material 15 and then performing the fabrication steps on both sides of the metal bonded connecting material 15 as previously set forth in this paragraph.

An alternative method of bonding the metal sheet 155 to the connecting material 15 by completely covering the connecting material 15 with the bonding agent 153 as described in the previous paragraph is to spot-bond the connecting material to the metal sheet only at the locations where the guard plates will be positioned in the completed fabric 150. With this method of bonding, a strong, usually rigid epoxy structural adhesive has been effective. No spot bonding adhesive is applied at the gap locations. The bonding agent 153 can be stenciled onto the connecting material 15, after which the metal sheet 155 is bonded to the connecting material 15 before the bonding agent 153 sets. Although, the spot bonding approach results in a fabric 150 that suits certain design criteria, the preferred bonding method is to use a continuous layer of bonding agent 153. The spot bonding method limits the accuracy of the guard plate 152 size and shape and the gap 154 between the guard plates 152 due to the inherent variations in the rheology of the bonding agent adhesives used for spot bonding and the process of screen printing those adhesives. Use of the continuous application of bonding agent is limited only by the etching process, which is very accurate. Using the continuous application of bonding agent 153 allows the creation of narrow gaps, up to the thickness of the metal sheet 155, between the guard plates. This increases the puncture and pierce resistance of the fabric 150.

To maintain proper flexibility of any of the finished fabric embodiments, it is important that the gaps between guard plates are free from materials that may compress or stretch during flexing of the fabric. Because the guard plate material is usually rigid and inflexible, most of the strain caused by bending the fabric is concentrated in the gap region. Even a soft material in the gap region may significantly contribute to the rigidity of the whole fabric because the strain is amplified at the gap region. Jamming of the neighboring guard plates as the fabric is flexed if the gap is too narrow can also compromise flexibility of the fabric. This jamming of neighboring guard plates occurs when the gap size becomes smaller than the thickness of the guard plate. But with the metal plate in the thickness range of 2–5 mils, it is possible to narrow the gap size between the guard plates to as small as the guard plate thickness without compromising overall flexibility. The narrowing of the gap is a worthwhile goal because the smaller the gap the less chance that a penetrating instrument will penetrate the fabric of this invention. Etching technology is sufficiently precise that a gap as thin as a metal sheet thickness in the range of 2–5 mils can be fabricated. A 2–5 mil gap size is much smaller than the typical medical needles, which range from 13 mils for insulin needles to 31 mils for a 21 gauge needle 156, which is shown in FIG. 32. A gap between plates of 2 mils will stop a 21 gauge needle from penetrating through the gap into the wearer's skin. And, since flexibility of the fabric is enhanced when the plate thickness is no greater than the gap size, the plate thickness should be no greater than 2 mils. A gap size greater than 5 mils will not stop the penetration of a 21 gauge needle through the fabric and since plate thickness should be no greater than the gap size, the plate thicknesses for use with a 5 mil gap size should be no greater than 5 mils. To reduce the gap to a size that will stop a 21 gauge needle, therefore, requires a plate thickness in the range of 2–5 mils. Typically, polymeric plates are not strong enough to resist penetration of the plate at thicknesses of 5 mils or less. On the other hand, metal plates in the 2–5 mil thickness range are strong enough to resist penetration.

A 21 gauge medical needle, as illustrated in FIG. 32, consists of a sharp tip followed by a cutting edge. The angle of the tip is about 26 degrees, so that for every 1 mil of gap size between the metal guard plates, the tip of the needle can advance 2 mils. If the gap size between metal guard plates is 2 mils, then as long as the fabric is thicker than 4 mils, the needle tip will have to break the guard plates around the gap in order to penetrate through the fabric. Even when the needle tip directly hits the gap, it will take a certain level of force for the needle to penetrate through the gap because this involves bending and deforming the metal guard plates, delamination of the adhesive, and tensile stretching of the base material. By optimizing the design parameters when designing the fabric for various applications a sizable resistance may be obtained even at the weakest points of the fabric, the gap between the guard plates. If the gap size between the guard plates is sufficiently small such that the puncture resistance of the gap is adequate, sliding of the needle tip on the surface of the metal plate is less of an issue. In such a case solid metal sheet without any treatment for resisting needle slide can be used and still maintain a high level of puncture resistance.

A material suitable for the metal plates is stainless steel sheet 2 having a 2 to 5 mil thickness. H. B. Fuller UR-2139 and Ciba 2040 polyurethane adhesives have been found to be effective. These adhesives are chosen for their flexibility, their bonding strength, and their ability to maintain good bonding strength after the etching process. An example of the base fabric used with the metal plate construction, with or without wire mesh reinforcement, is Amara. A suitable connecting material for embedding in adhesive is chiffon fabric.

Figure 31:
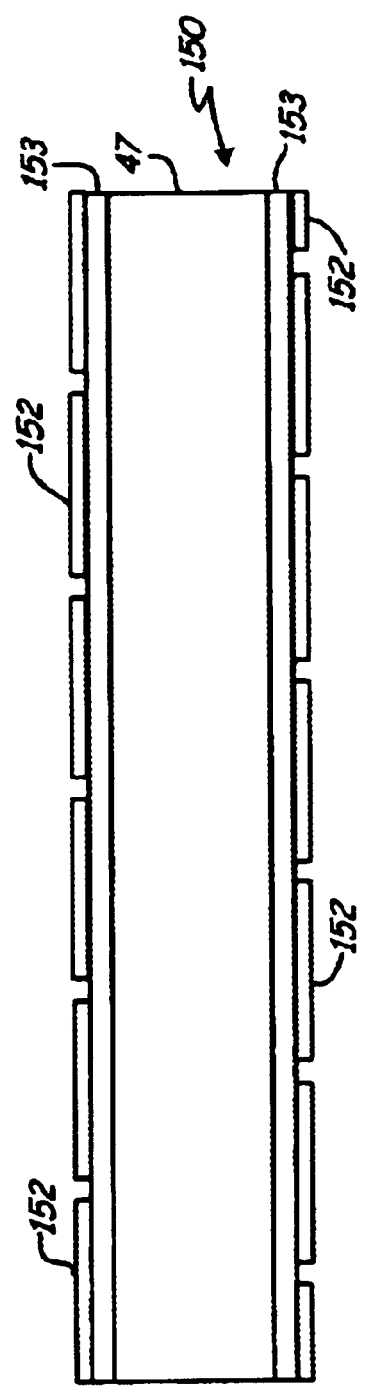
FIG. 31 shows a cross section of FIG. 9 using metal for the guard plates instead of polymer.

An SF15 fabric, as illustrated in FIGS. 9 and 10, can be made using the metallized guard plate approach of FIGS. 30A and B. Two metal guard plate 152 layers are used. Each guard plate 152 layer is offset from the other as described in connection with the SF15 fabric. Between each metal guard plate 152 layer is a base material 47 as illustrated in FIG. 31. The base material 47 can be the synthetic leather material Amara. The metal sheet 155 may be bonded to the base material using a bonding agent 153. Another embodiment of a double metal plate fabric comprises two metal sheets bonded together with or without a connecting or base material between them. A flexible bonding material is most efficacious, but if a rigid bonding material is used, spot bonding rather than continuous bonding of the two sheets is necessary to obtain a flexible fabric. In the two metal sheet embodiment, photoresist films are applied on both sides and the metal is etched to leave disconnected plates to form a flexible plate layer.

FIGS. 33A and B depict an embodiment of the fabric of this invention comprising metal guard plates reinforced with wire mesh. FIG. 33A is an intermediate step in the process of manufacturing the metal guard plate reinforced wire mesh fabric 160. The intermediate step comprises a composite of a metal sheet 155 bonded by a bonding agent 153, such as a flexible adhesive, to connecting material 15, such as chiffon, which is in turn bonded by a suitable bonding agent 153 to a wire mesh 52 with the bonding agent 153 shown on the bottom of the wire mesh 52, which results due to the fact that when the bonding agent 153 is poured on the porous wire mesh 52, it runs through the wire mesh 52. During the fabrication process, as previously described with reference to FIGS. 27 and 30, the fabric 160 of FIG. 33B is formed, which is comprised of metal guard plates 152 reinforced with wire mesh 52 and interconnected with connecting material 15 that is an integral part of a guard plate layer 162. If necessary for a particular application, multiple layers of guard plate layers 162 may be stacked upon one another and may be registered with respect to one another so that the apertures extending through the multiple layer fabric may be minimized in number and size or may be totally eliminated.

Figure 34:
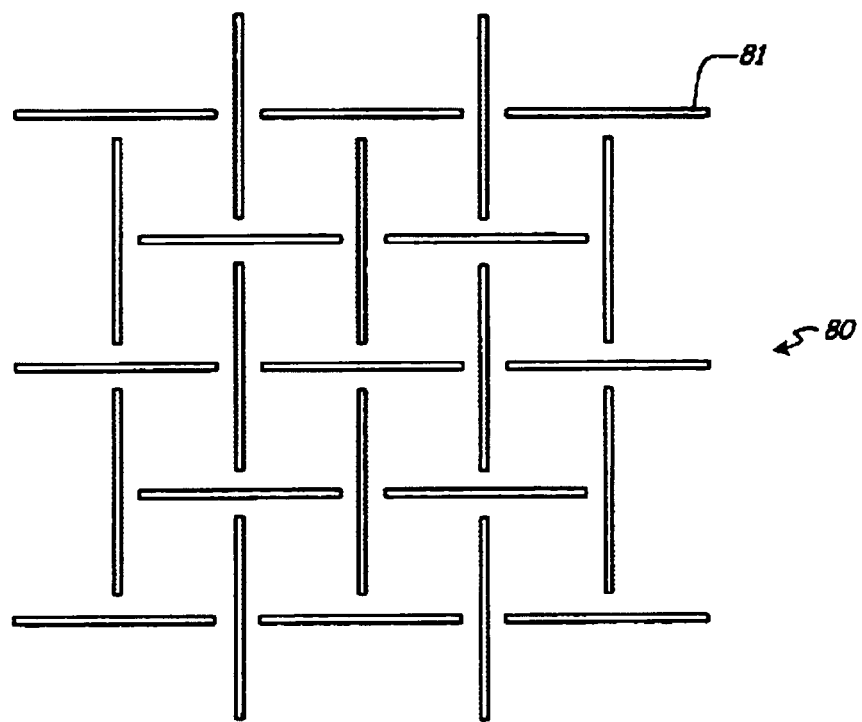
FIG. 34 illustrates another method for bonding multiple layers together.

FIG. 34 illustrates another method for bonding multiple layers together. This method of bonding may be used with almost any embodiment of the fabric depending upon the specific objectives of the particular fabric's use. The objective for this bonding method or arrangement is the same as for other bonding methods illustrated in this disclosure, that is, to bond the layers together securely while not sacrificing the overall flexibility of a multi-layered fabric. The bonding method 80 of FIG. 34 achieves this objective by using flexible adhesive arranged in an array of shapes in the form of disconnected lines (or elongated rectangle or similar shapes) 81 with neighboring disconnected line shapes perpendicular to each other.

Description of Fabric Test
Test Equipment and Procedures

Needle puncture testing was performed on samples of fabric described in this specification using an Imada puncture resistance tester, model number DPS-44R, available from Imada, Inc., 450 Skokie Blvd., Suite 503, Northbrook, Ill. 60062. The puncture tester is capable of measuring forces in the range of 0–44 pounds. A fabric sample is placed on top of the tester's metal base. A needle (typically 20 mils in diameter with a cone shaped tip) is attached to the tester probe, which is positioned vertically above the fabric sample. The probe moves toward the fabric sample with a fixed velocity (for example, 80 mm/minute). The puncture tester measures and records the peak force attained during the puncture attempt. Each test uses a fresh probe. The standard test is at a 90° angle to the surface of the fabric sample. The tester is adjustable to vary the angle at which the test needle impinges upon the fabric sample.

A cut resistant tester was designed and constructed to test the cut resistance of the fabric claimed in this specification. The cut resistance tester is similar to the standard cut resistance tester described by ASTM F 1790-97, Standard Test Method for Measuring Cut Resistance of Materials Used in Protective Clothing. A fabric sample is mounted on a brass sheet covered wooden drum of the tester. A razor blade, attached to a lever arm of the cut tester, rests against the fabric surface. A predetermined weight is applied to the lever, creating a known cutting force. The drum is hand rotated at a slow, fixed speed so the razor blade cuts against the fabric and parallel to it for a distance of 4 inches. If the razor blade cuts through the sample within the 4 inches, the threshold cut-through force is measured and recorded. If the sample is not cut through within the 4 inches, the test result is recorded as "no-cut." A new razor blade is used for each test.

Test Results of Fabric Samples Using The Puncture and Cut Testers

SF15 Fabric

The SF15 fabric is illustrated and described above with reference to FIGS. 9 and 10. Amara®, a non-woven polyurethane and nylon synthetic leather, is used as the base material in preparing a sample of SF15. The Amara® base material is about 20 mils (that is, 20 thousandths of an inch) thick. A polyester chiffon connecting material is laid on top of the Amara® and polymer resin plates are screen printed onto the materials using a 10 mil thick stainless steel stencil. The printed pattern is a hexagon array with 80 mil hexagons (minor diameter). The gap size between the hexagons is 14 mils. The polymer resin is a one-part heat-curable epoxy resin, formulated by Fielco Industries, Inc., 1957 Pioneer Rd., Huntingdon Valley, Pa. 19006 and designated as TR12, as previously stated in this specification. The resin is heat cured at 120° C. for one hour. Then, similar stencil printing is done on the other Amara® surface, with the hexagon array properly registered as shown in FIG. 10B to obtain the SF15 fabric seen in FIG. 9. The resulting SF15 fabric is flexible and is about 45 mils thick.

Using a grabbit needle as a probe, the puncture resistance of the SF15 sample fabric was determined to be 3.5±0.7 lbs. for a needle impinging the fabric at a 90° angle of attack and 3.1±0.7 lbs. for a 30° angle of attack. The cut resistance measured to be above 7 lbs. A grabbit needle or pin is a pin found in an office supply store. It is about 20 mils in diameter with a cone shaped tip. It is used as a puncture probe because of its sharpness and thinness.

SF16 Fabric

The SF16 fabric is illustrated and described in this specification with reference to FIGS. 11 and 12. Devcon Plastic Steel® Putty (A) is screen-printed on polyester chiffon fabric supported on a release backing using a 10-mil thick stainless steel stencil to obtain a guard plate layer as in FIG. 11. The resin is heat cured at 70° C. for 45 minutes, followed by 4 hours post curing at room temperature. Three identical layers are bonded together in properly registered positions, as shown in FIGS. 12A and 12B, using FleshTex® polyurethane resin available from Zeller International, 623 Ellen Dr., Winter Park, Fla. 32789. FleshTex® is a polyurethane-type multi-part (2 or 3 parts) thermoses resin. FleshTex® cures at 70° C. for 30 minutes. The total thickness of the SF16 fabric sample was about 65 mils.

The SF16 sample was puncture tested using a grabbit pin. Under a 2.0-lb. force, no penetration was observed at 90°, 52°, and 30° angles of attack. The cut resistance of the sample was 14 lbs.

SF17 Fabric

The SF17 fabric is illustrated and described in this specification with reference to FIGS. 13–15. Amara®, with a 20-mil thickness, is the base fabric. The materials used and the printing process is as described above in the section of this specification titled SF15 Fabric. However, the printing of the layer 62 uses a stencil pattern to imprint the SF17 guard plates 64 and 66, as shown in FIG. 13. The resulting SF17 fabric is flexible and has a thickness of about 45 mils.

Using a grabbit needle as a probe, the puncture resistance of this SF17 fabric sample measures to be 3.4±0.7 lbs. for a 90° angle of attack, and 3.1 ±0.7 lbs. for a 30° angle of attack. The cut resistance measures to be 8 lbs.

SF22 Fabric

The SF22 fabric is illustrated with reference to FIGS. 18 and 19. Amara®, with a 10-mil thickness, is used as the base material 47. Polyester chiffon, used as the connecting material 15, is laid on top of the Amara® and stenciled with the Fielco polymer resin, as described above in the section titled SF15, to form the guard plate 42 array layer 44 seen in FIG. 19B. The polymer resin is cured as described in the section titled SF15. Two such guard plate 42 array layers 44 and 46 are formed. On layer 44, a layer 72 of circular aperture plates 74 is printed, as illustrated in FIG. 19. The layer 72 may be printed through a chiffon layer 15, as in FIGS. 19A and 19B, although it is also possible to print layer 72 without a chiffon layer. For optimum performance, the aperture layer 72 should incorporate a connecting material 15.

The layers 44, 46, and 72 are bonded together, in properly registered positions, as shown in FIG. 19. The guard plate 74 array of layer 72 may or may not be cured before bonding the layers 44, 46, and 72 together. If layer 72 has not been cured before bonding layers 44, 46, and 72, the SF22 fabric 70 is then cured. The resulting SF22 fabric is flexible and has a thickness of about 50 mils.

The puncture resistance for this fabric, using a grabbit pin as the probe, measured to be 3.5±0.5 pounds for a 90° angle of attack and 3.0 ±0.5 pounds for a 30° angle of attack. The cut resistance measured to be 9 pounds.

SF16 Fabric

Guard plate layers of the wire mesh reinforced fabric are made using the process described in FIG. 27. The UV-resin is Ebecryl 645 from UCB Chemicals. The photo-initiator is Irgacure 184 from Ciba. 100 parts of UV resin is mixed with 2 parts of photo-initiator. Wire mesh is from Sefar America, Inc. The wire is made of stainless steel 316 with mesh count of 165×165 per inch. The wire diameter is 0.0025 inch. The opening size is 0.0036 in. The weight density is 6.75 lb/sq. ft.

In the SF16 design as shown is FIGS. 11 and 12, the guard plates are 60-mil hexagons. The gap size is 7 mils. The total thickness of individual layer is 10~12 mils.

For bonding, 31 mil diameter adhesive dots are used. They are separated periodically by 0.34 inch. The bonding adhesive is Fleshtex from Zeller International. 10 parts of FleshTex component A and 10 parts of FleshTex component B are mixed and then added to 0.8 parts of Cab-O-Sil flow modifier.

The samples are tested using a 21 guage medical needles with a 30 degree angle of attack. This represents one of the harshest conditions for the puncture test. Four samples were made and 20 puncture tests were done on each sample. The lowest threshold force observed for needle penetration was found to be 1.1 pounds. The average force was 2.26 pounds (the average was based upon 100 data points). The puncture resistance force ranged from 1.1 to 4.0 pounds.

SUMMARY OF DETAILED DESCRIPTION

The fabric embodiments of this invention have application for protective garments for individuals working in occupations exposed to potentially injurious penetration, such as public safety officers, machinists, butchers, surgeons, and the like. Depending upon the thickness of the fabric, dimensions and styles of the plates, and the substances and materials from which the fabric of this invention is constructed, the protective garments may have properties ranging from resistance to stabbing and cutting, up to resistance to needles. When the fabric of this invention is used for penetration and puncture resistance, the plates are made of a hard penetration or puncture resistant substance. Preferably, the penetration and puncture resistant apparel or item made from the fabric of this invention will have the hard plates of the array oriented toward the expected source of penetration or puncture. Sport and outdoor apparel of fabric according to this invention may be insect and snake bite proof Apparel from the present inventive fabric may be suitable for specific activities and environments calling for protection from penetration or puncture, including apparel for riding open uncovered vehicles such as motorcycles, industrial safety apparel, underwater diving wear, and penetration or puncture resistant footwear and head coverings. Other items that require resistance to penetration are made from fabric of this invention, including liquid-retention liners for oil tankers, ponds, landfills, swimming pools and tires. Articles requiring penetration-resistance, including inflatable rafts, light watercraft, such as canoes, kayaks and racing shells, or air mattresses may be fabricated from fabric of this invention. Apparel for other occupations as well as for applications in the medical and dental fields will require differing penetration and puncture resistant substances and material types. Differing thickness and dimensions of the plates are required, since the forces that come to bear upon the fabric will vary.

For medical gloves, the sizes and shapes of the guard plates and the aperture plates and the substance of which they are made, may vary, according to the particular procedures to be performed and differing conditions. It may not be necessary to fortify an entire glove with a puncture resistant fabric of this invention. The fabric may strategically reinforce only high-risk zones.

This fabric is not dependent upon specific shapes or dimensions of the plates. The fabric is scaleable to meet widely varying possible uses. The choice of shapes and dimensions, and the substance and material of which they are manufactured, are dependent upon the application and are determinable by routine engineering calculations. The fabric of the invention, when manufactured of substances and materials of suitable strength, resistance, and dimensions forms a flexible, cut, puncture, and pierce resistant enclosure for biohazardous and potentially flammable and/or explosive liquids, including gasoline and other petroleum or fuel products. Such flexible enclosures find use as liners in various types of tanks or similar liquid reservoirs.

The substances of which the plates are manufactured are currently available as off-the-shelf goods or in the case of resin are readily formulated by resin manufacturers to meet design parameters required of the fabric for use in various applications. The substances can be, for example, metal (such as stainless steel or titanium), metal alloys, ceramic, polymers, high strength composites (such as carbon fiber or glass composites), or glass. Any other substance may be used that resists the specified puncture, piercing, and cutting forces at the chosen thickness necessary to achieve the characteristics desired for the application. Other examples of suitable products include epoxy or acrylate resins, such as Darocur®, Epon®, or Ebecryl®; other thermoset resins whether; and mixtures of such resins with other polymers and optionally with various suitable curing agents. Any substance should preferably not be friable or brittle. When the fabric forms a liquid enclosure or receptacle or is used in a liquid environment, the selected substances and materials for the fabric should be resistant to chemical or physical action of the contained liquid.

The process of assembling the fabric of this invention uses currently available production technology and the novel method of printing plates onto a base material, as described in this specification.

The surfaces of any of the plates described in this disclosure may be planar, concave, convex, or any combination thereof, or a specially constructed surface to meet the needs of a particular application. The guard and aperture plates used in the inventive fabric for differing applications will have a thickness sufficient to resist the piercing or cutting force that the fabric is intended to resist. The plates of different layers of the same inventive fabric may each be made of different substances.

A connecting material is any material, which when interconnected between the plates of the fabric, maintains a predetermined spatial relationship of the plates within the fabric and within a prescribed range of motion of the plates relative to one another. To do so, the connecting material should be flexible. The connecting material may be continuous or have certain selected discontinuities, as long as it performs the needed function of maintaining and connecting the array of plates in the fabric. Any discontinuities in the material may be chosen to enhance the properties of flexibility, bendability, and twistability, and, optionally, stretchability in the fabric or in the useful article made with the fabric. Any discontinuities in the material must be so chosen and located that they do not compromise the required penetration resistance of the fabric either locally or globally or of the useful article constructed of the fabric. Such discontinuities must also be so chosen and located that they do not deleteriously affect the structurally integrity of the fabric or allow any portion of the array to separate. The material may be elastomeric or non-elastomeric. The material is chosen with regard to promoting the desired three degrees of freedom of movement of the fabric of this invention, including flexibility, bendability, and twistability. The material may also be chosen to enhance the desired properties of elasticity and stretchability in the inventive fabric. A stretchable material, such as an elastomer, is an example of a flexible material suitable for performing this function. However, a non-stretchable material is suitable for certain applications. The material may be man-made, naturally existing, or blends of the two.

As with other embodiments set forth in this specification, other variations are appropriate to meet the functional and utilitarian needs of the application. Such variants are choices that come within the spirit and scope of this invention.

This specification has described and illustrated various embodiments of the penetration resistant fabric of the invention. Various arrangements of plates and layers have been described. However, these illustrated and described arrangements are not intended to be the only arrangements for implementing and achieving the objectives of the present invention, nor are they the only possible embodiments encompassed by this invention. This invention is capable of modification within the scope of the inventive penetration resistant fabric and, therefore, the invention is not limited to the precise detail set forth in this specification. This invention includes all changes that fall within the purview of the appended claims.

What is claimed is:

1. A fabric assembly comprising;
    a flexible substrate having a top surface;
    a plurality of polymeric resin plates having substantially uniform thickness of approximately, 5 to 20 mils; the plurality of plates affixed to the top surface of the flexible substrate and arrayed in a pattern such that a plurality of continuous gaps are defined between adjacent plates, wherein the gaps are approximately uniform in width; and
    a wire mesh embedded in each plate and completely covered by the top surface by each plate.

2. The fabric assembly of claim 1 wherein the plate thickness is approximately 10 to 12 mils.

3. The fabric assembly of claim 1 wherein the gap width is approximately 7 mils.

4. The fabric assembly of claim 1 wherein the polymeric resin comprises epoxy resin.

5. The fabric assembly of claim 1 wherein the plurality of plates each are shaped as identical equilateral hexagons.

6. The fabric assembly of claim 5 wherein the hexagons are approximately 60 mils in diameter.

7. The fabric assembly of claim 1 wherein the wire mesh is stainless steel.

8. A fabric assembly comprising:
    a first flexible substrate having a first plurality of continuous, non-overlapping plates affixed to a top surface of the first flexible substrate;
    a second flexible substrate having a second plurality of continuous, non-overlapping plates affixed to a top surface of the second flexible substrate; and
    a third flexible substrate having a third plurality of continuous, non-overlapping plates affixed to a top surface of the third flexible substrate, wherein the flexible substrates are arranged in a stack, and wherein each plurality of plates is arrayed in a pattern such that a plurality of gaps are defined between adjacent affixed plates, wherein each plate is an equilateral hexagon made of polymeric resin, wherein each plurality of gaps is approximately uniform in width in the range of about 5 mils to 20 mils, and wherein each equilateral hexagon has an approximately uniform thickness in the range of about 5 mils to 20 mils, and wherein one of the pluralities of plates have a larger gap width and plate diameter than the other two pluralities of plates.

9. The fabric assembly of claim 8 wherein the other two pluralities of plates each have a plate diameter in a range of 60 to 80 mils.

10. The fabric assembly of claim 8, wherein at least one of the substrates comprises polyester.

11. The fabric assembly of claim 8, wherein at least one of the substrate comprises nylon.

12. The fabric assembly of claim 8, wherein at least one of the pluralities of plates comprises epoxy resin.

13. A glove comprising the fabric assembly of claim 8.

* * * * *